United States Patent [19]

Gerst et al.

[11] Patent Number: 4,925,007

[45] Date of Patent: May 15, 1990

[54] ELECTRICAL LEAD PARKING AND SORTING STATION

[75] Inventors: Michael Gerst, Worms; Horst J. T. Knapp, Gross-Zimmern; Werner Maack, Seeheim, all of Fed. Rep. of Germany

[73] Assignee: AMP Incorporated, Harrisburg, Pa.

[21] Appl. No.: 158,963

[22] Filed: Feb. 19, 1988

[30] Foreign Application Priority Data

Apr. 7, 1987 [GB] United Kingdom ................. 8708279

[51] Int. Cl.[5] ................................................ B65G 47/86

[52] U.S. Cl. .............................. 198/470.1; 198/476.1; 29/753; 29/759; 29/36; 414/226

[58] Field of Search ............... 198/470.1, 474.1, 476.1, 198/477.1; 29/857, 736, 753, 759, 33 J, 36; 211/164; 414/225, 226, 331, 736

[56] References Cited

U.S. PATENT DOCUMENTS

| | | | |
|---|---|---|---|
| 2,931,276 | 4/1960 | Zerlin | 198/474.1 |
| 3,766,624 | 10/1973 | Grebe et al. | 29/203 MW |
| 3,939,552 | 2/1976 | Hart et al. | 29/427 |
| 3,964,147 | 6/1976 | Fusco et al. | 29/203 B |
| 4,308,659 | 1/1982 | Brandewie et al. | 29/748 |
| 4,456,114 | 6/1984 | Mohn | 198/474.1 |
| 4,504,186 | 3/1985 | Richards | 414/736 |
| 4,524,596 | 6/1985 | Tsunekawa et al. | 29/335 |
| 4,526,270 | 7/1985 | Dichter | 198/420.1 |
| 4,559,702 | 12/1985 | Maack et al. | 29/759 |
| 4,596,072 | 1/1986 | Shields | 29/861 |
| 4,645,063 | 2/1987 | Seragnoli | 198/475.1 |
| 4,651,413 | 3/1987 | Maack et al. | 29/759 |
| 4,655,107 | 4/1987 | Juergenhake | 83/23 |

FOREIGN PATENT DOCUMENTS

| | | | |
|---|---|---|---|
| 0041332 | 12/1981 | European Pat. Off. . | |
| 2842342 | 9/1978 | Fed. Rep. of Germany . | |
| 2414845 | 1/1979 | France . | |
| 907711 | 2/1982 | U.S.S.R. | 29/736 |

*Primary Examiner*—Joseph E. Valenza
*Attorney, Agent, or Firm*—Eric J. Groen

[57] ABSTRACT

The lead parking and sorting station is for receiving electrical leads (L), especially those which differ from one another and for presenting the leads for pick up by a block loading station. The parking and sorting station comprises a pair of ganged jaw wheels (12 and 16) each having lead gripping jaws (13). The jaw wheels (12 and 16) can be swung to move each jaw wheel ( 12 and 16) between a lead loading position (LP) and a lead sorting and discharge position (DP). When in its loading position (LP), each jaw wheel (12 and 16) is driven by a unidirectional stepping motor (14) in constantly spaced steps, to pick up a lead (L) at each step. When it has been loaded with leads (L) each jaw wheel (12 and 16) is swung to its sorting and discharge position (DP) where it is driven by a bidirectional stepping motor (18), in steps, the length and direction of which are determined by a pre-arranged harness making program, the leads being picked up by the block loading station at a pick up position (PP).

10 Claims, 28 Drawing Sheets

38
56
14
48
54
53
52
3e
41
55
39
41
18
50
V
V
2

ELECTRICAL LEAD PARKING AND SORTING STATION

This invention relates to an electrical lead parking and sorting station for receiving electrical leads and presenting the leads for pick up, in a predetermined order according to a program.

There is now a demand, especially in the automotive industry, for electrical harnesses comprising electrical leads which differ from one another, for example in respect of color, gauge, in the composition of their insulation, or in the nature of electrical terminals on the leads. The leads must be arranged in a particular order for feeding to harness making machinery in that order.

According to the invention, the parking and sorting station in characterized by a support structure, a lead carrier support mounted to the support structure for swinging movement relative thereto, a pair of lead carriers each connected to the lead carrier support for rotation relative thereto, and each having a series of pairs of lead gripping jaws constantly spaced from each other about its axis of rotation and jaw drive units for individually and sequentially opening and closing the pairs of jaws as determined by said program, a lead carrier support drive unit actuable to swing the lead carrier support relative to said support structure, thereby to swing each lead carrier in turn between a lead loading first position and a lead sorting and discharge second position, and lead carrier drive means actuable intermittently to rotate each lead carrier through equal first angular steps about its axis when the lead carrier is in its first position and bidirectionally through unequal angular second steps about its axis as determined by the program, when the lead carrier is in its second position.

Thus, the drive means and the drive units can be programmed so that a pair of jaws of a lead carrier in its first position are opened at each step to receive a lead, leads being supplied to the lead carrier in its first position, for example, by a lead conveyor of a lead making machine, until each pair of jaws carries a lead, after which the lead carrier support drive unit is actuated to swing the lead carrier thus fully loaded, to its second position for bidirectional rotation according to the program, to present the leads in a predetermined order and one by one to lead a pick-up position at which the pair of jaws carrying the lead is opened to allow the lead to be picked up, for example by jaws of a block loading mechanism.

The fact that there are two lead carriers one of which is being loaded whilst the other is being discharged, substantially doubles the output of the station.

In a double-ended harness making apparatus, two lead parking and sorting stations may be arranged opposite to one another, one end of each lead being loaded into a pair of jaws of a lead carrier of each parking and sorting station when the lead carrier is in its first position. The lead carrier of each parking and sorting station, when the lead carrier is in its second position may be so operated that leads carried thereby are crossed over one another as may be required by the program.

In order to avoid tangling of the leads carried by the loaded lead carrier, when said carriers are being swung in one sense from their first to their second positions, a drive mechanism is preferably provided for rotating each lead carrier through half a revolution about its axis of rotation, in the opposite sense, as the lead carriers are being swung. Thus, the uppermost lead of the loaded lead carrier remains the uppermost lead as the lead carriers are being changed over.

In the interest of driving the lead carriers most accurately through their steps according to the program, the lead carrier drive means preferably comprises a unidirectional first stepping motor for rotating each lead carrier through said first steps and a bidirectional second stepping motor for rotating each lead carrier through said second steps when the lead carrier is in its second position.

The stepping motors may be fixed with respect to the support structure, in which case means are provided for connecting each lead carrier to the first stepping motor when the lead carrier is in its first position, for connecting each lead carrier to the second stepping motor when the lead carrier is in its second position and for disconnecting each lead carrier from its first or second stepping motor, as the case may be, to allow the lead carriers to be swung between their first and second positions.

In a preferred embodiment of the invention, the lead carrier support is swingable by its drive unit about a horizontal axis, the axis of rotation of the lead carriers extending on either side of the swinging axis of the lead carrier support and in parallel relationship thereto.

The means for connecting and disconnecting the lead carriers from their driving means may comprise an extensible shaft or axle of each lead carrier which is arranged to be driven, into and out of, driving relationship with a shaft of the respective stepping motor under the action of a control device which is actuated according to the program.

Conveniently, and according to a preferred embodiment, the support structure comprises a base plate with a bearing support block mounted thereon and supporting each of said shafts, the drive means of the lead carriers being mounted on the same side of the base plate as the bearing support block and the drive unit of the lead carrier support being mounted on the opposite side of the base plate and having a drive spindle extending at right angles to the shaft of the lead carrier support drive unit and being drivably connected thereto through gearing.

For a better understanding of the invention and to show how it may be carried into effect, reference will now be made by way of example to the accompanying drawings in which:

FIG. 1 is a diagrammatic plan view of a double-ended harness-making apparatus comprising a pair of harness-making units and a harness ejection and bundling station;

FIGS. 2A and 2B when assembled along the lines W—W in these figures, provide a diagrammatic isometric view of a harness making unit and said ejection station of the harness making apparatus;

Figure 3A:
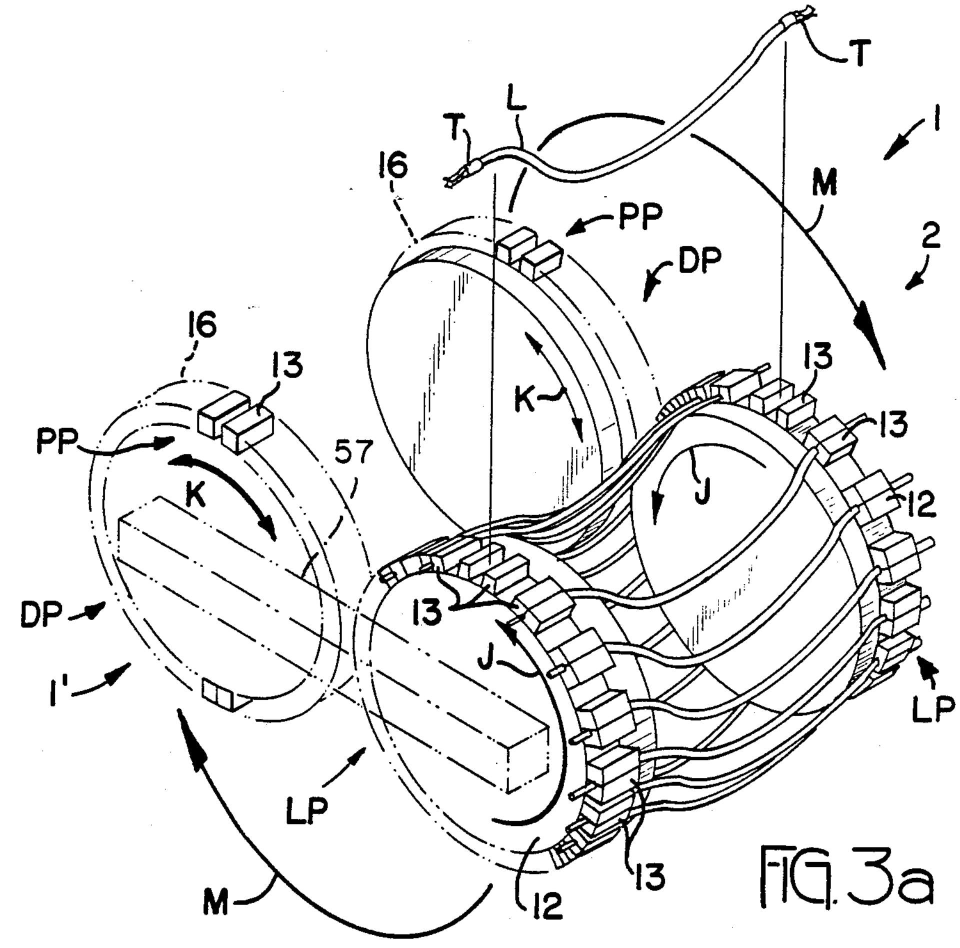
FIG. 3A is a diagrammatic, isometric view illustrating the operation of jaw wheels of a lead parking and lead sorting station of the harness making apparatus.
Figure 3F:
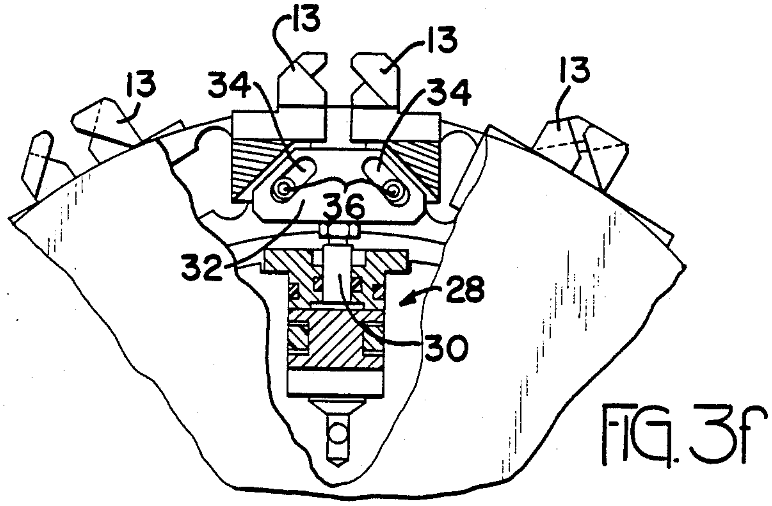
FIG. 3B is a diagrammatic front view of the parking and sorting station.
Figure 3B:
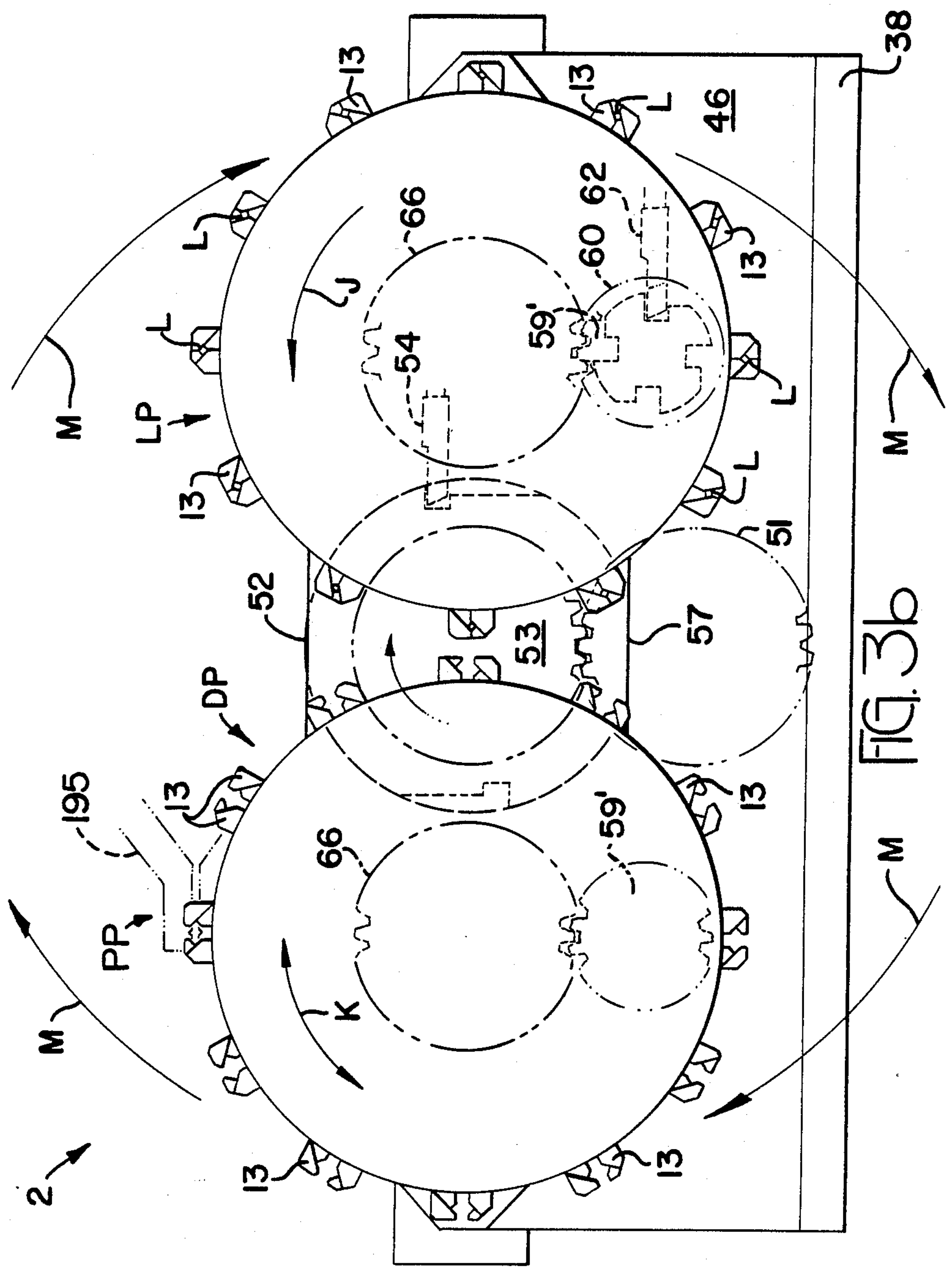
Figure 3C:
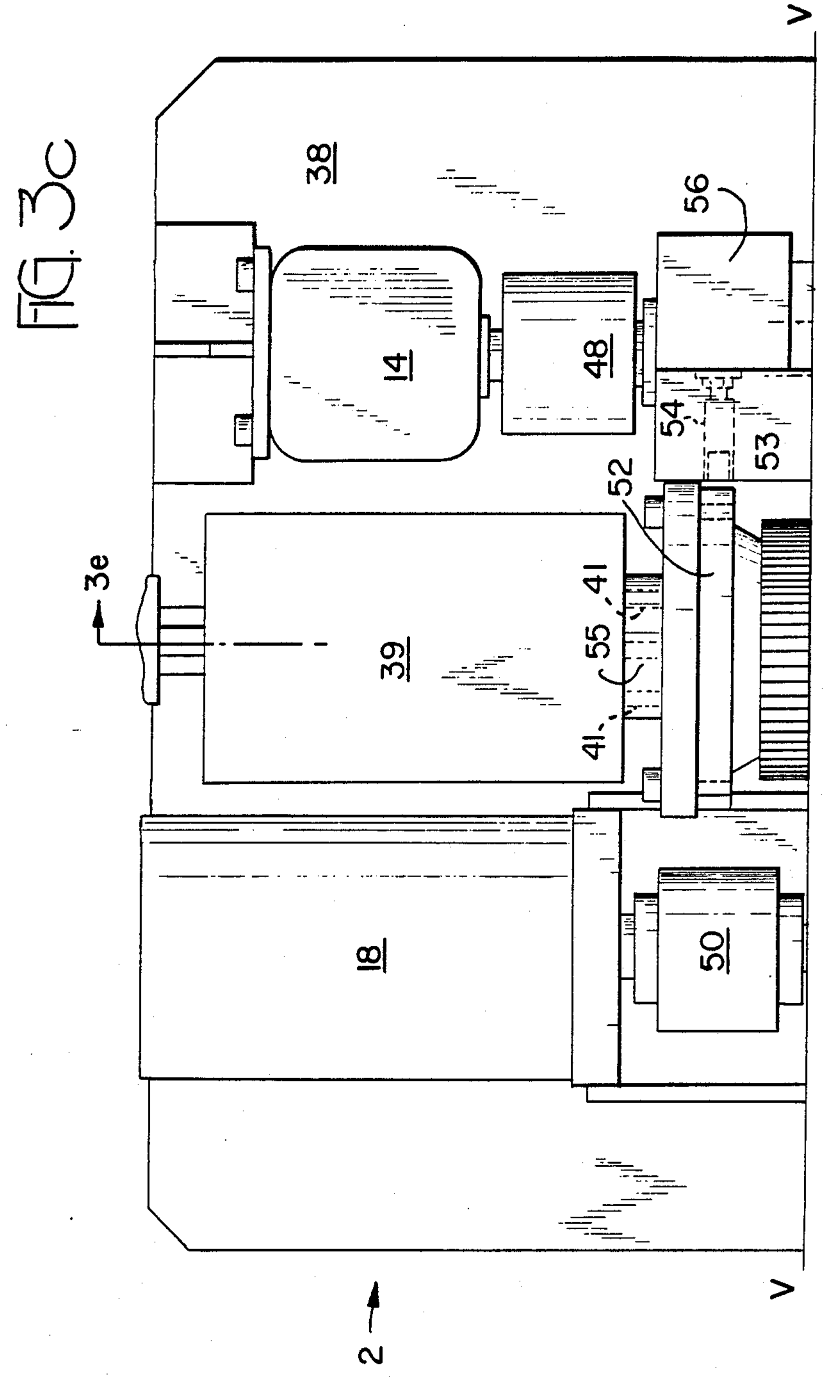
Figure 3C:
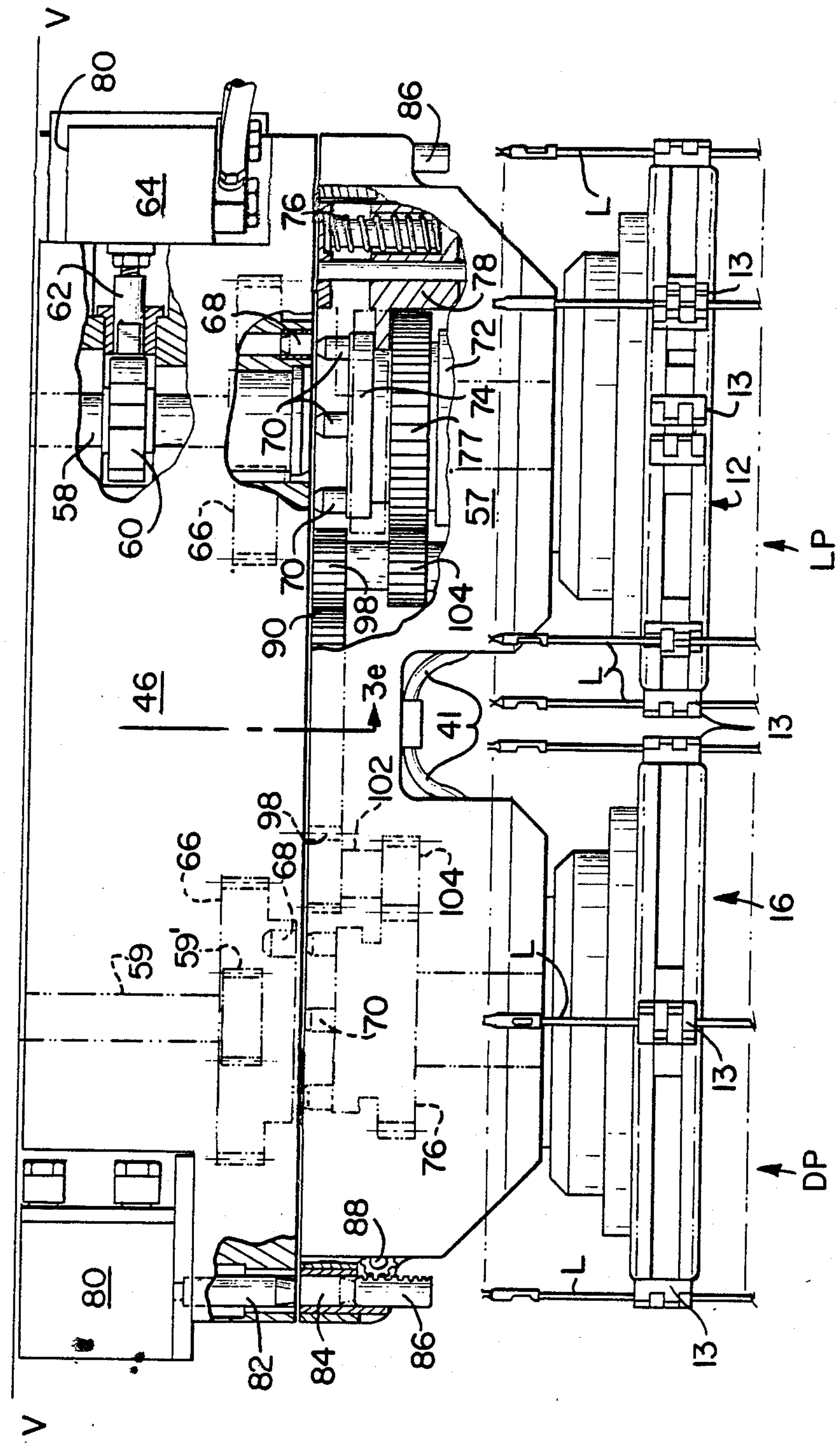
Figure 3D:
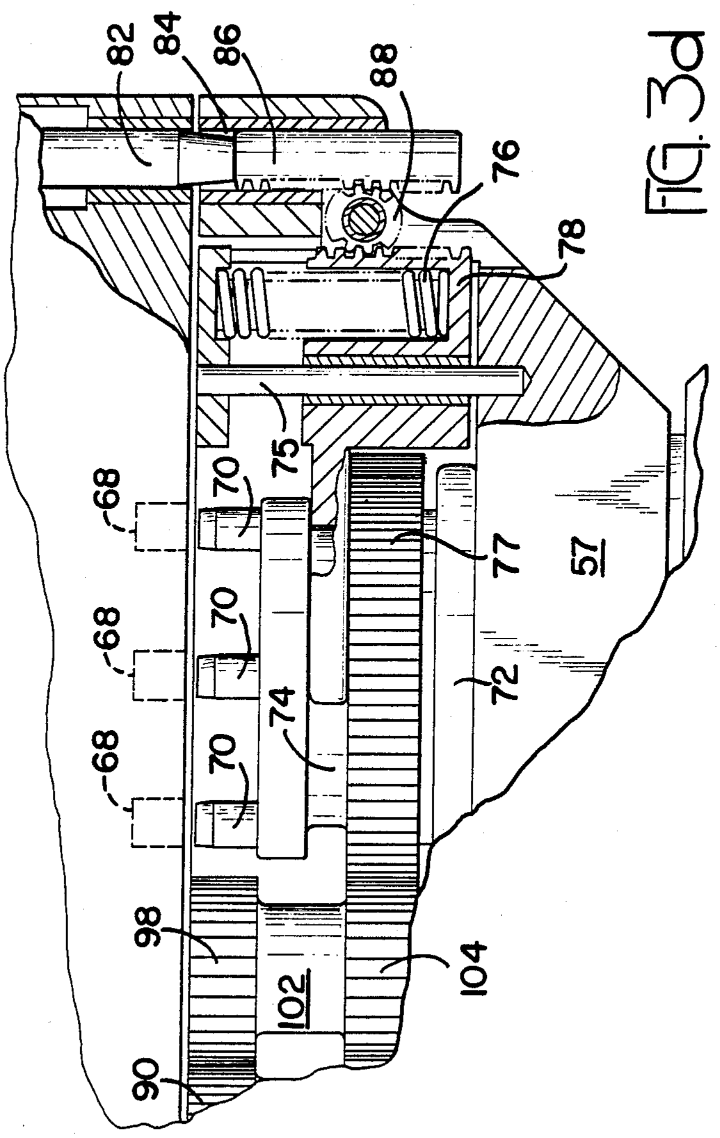
Figure 3E:
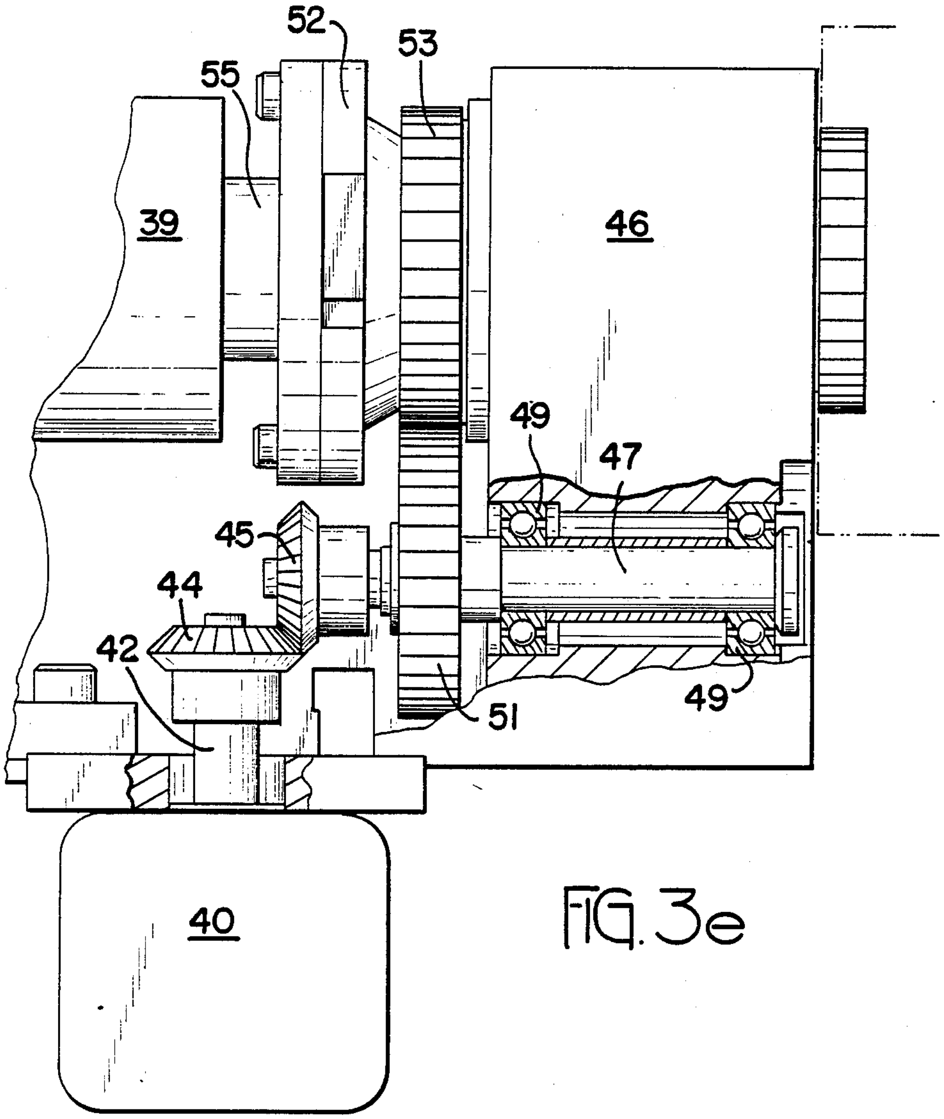
Figure 4A:
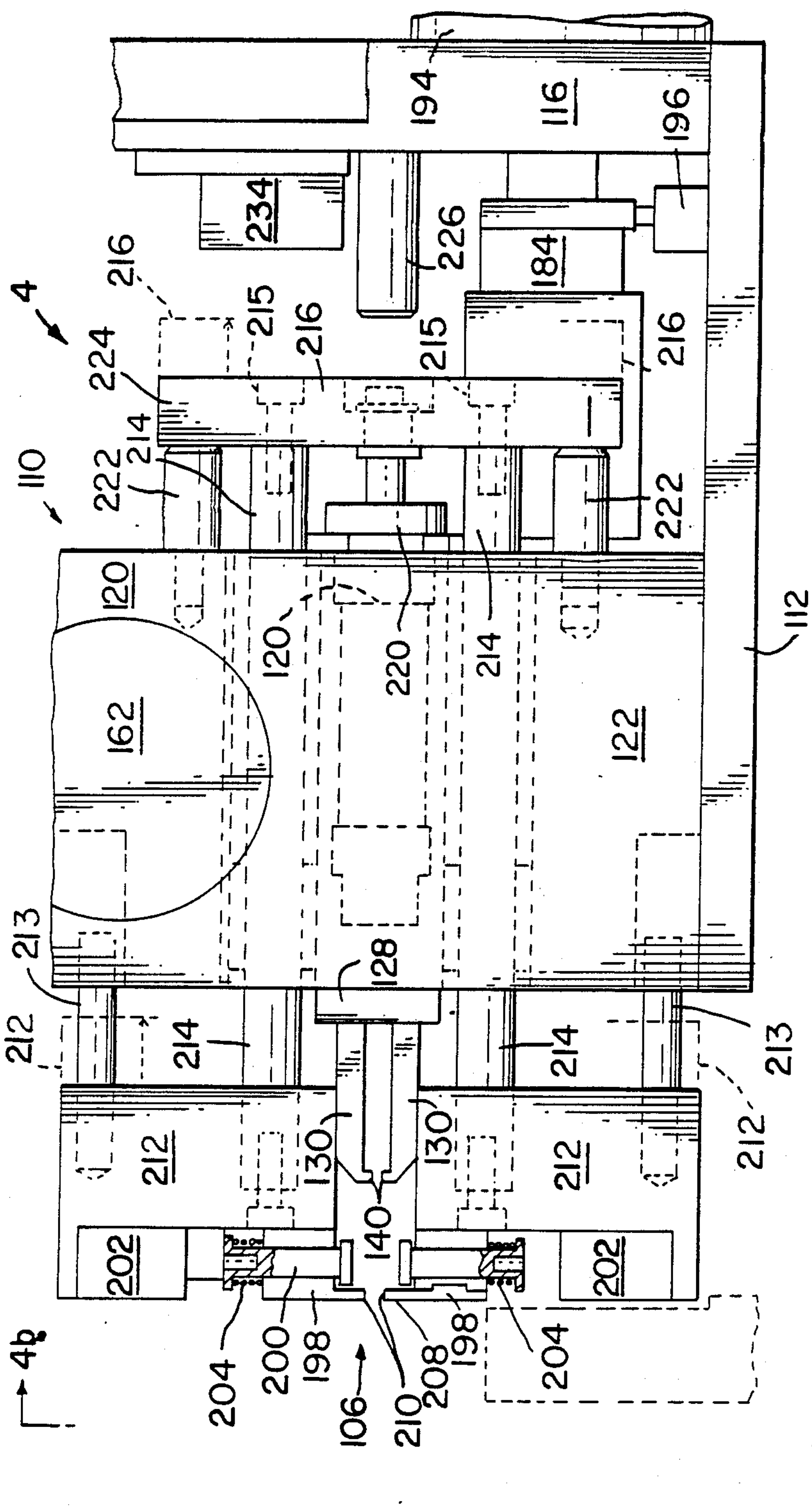
Figure 4B:
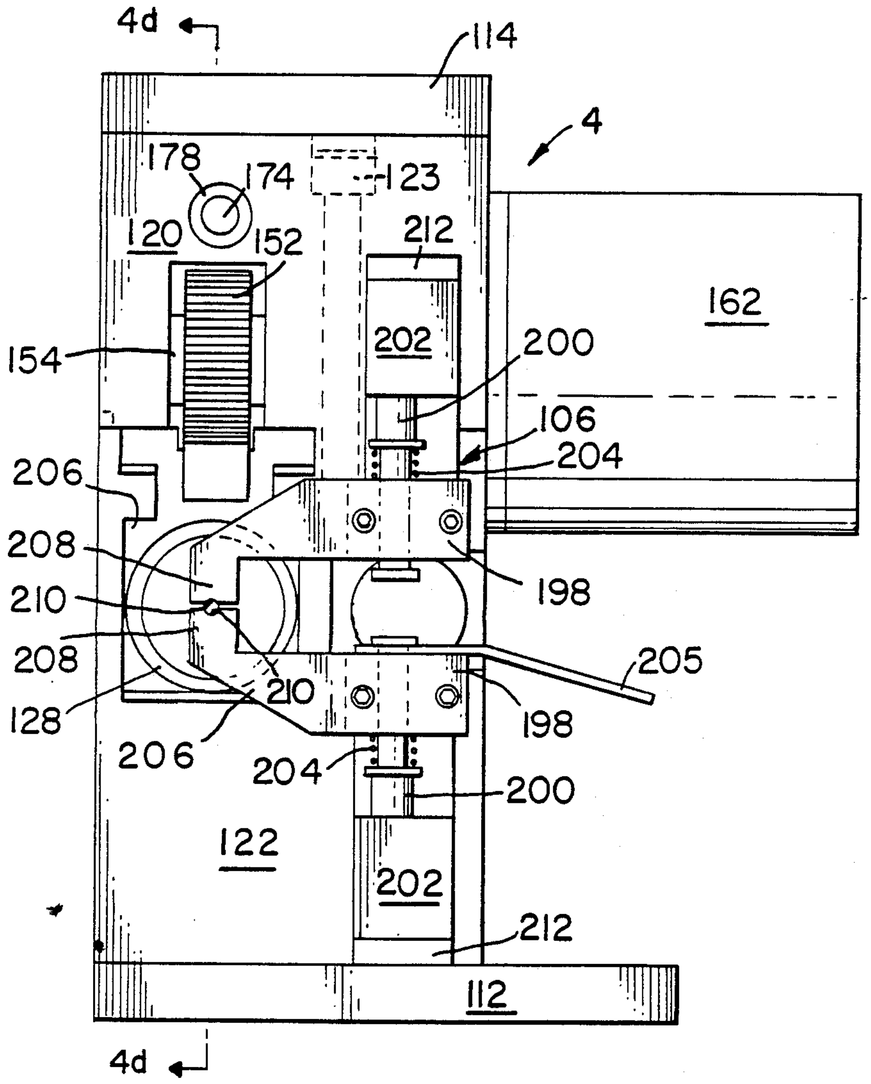
Figure 4C:
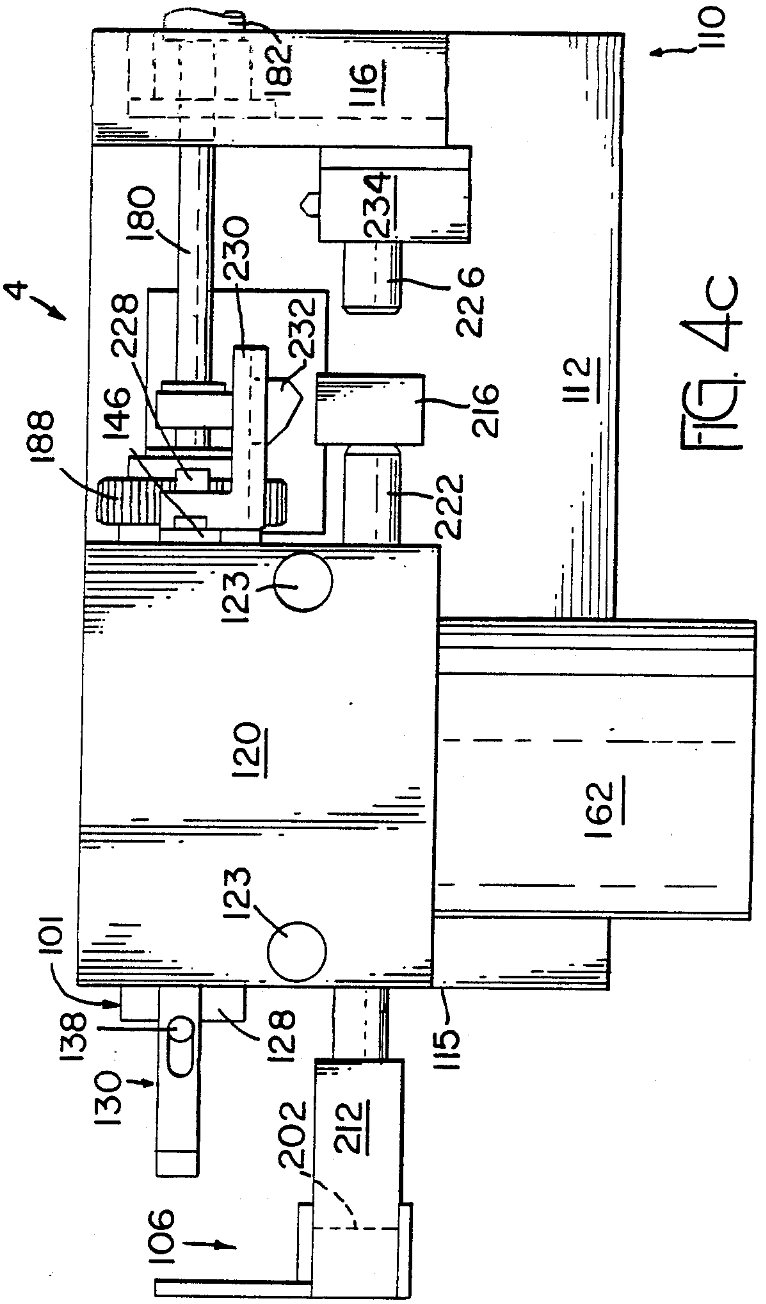
Figure 4D:
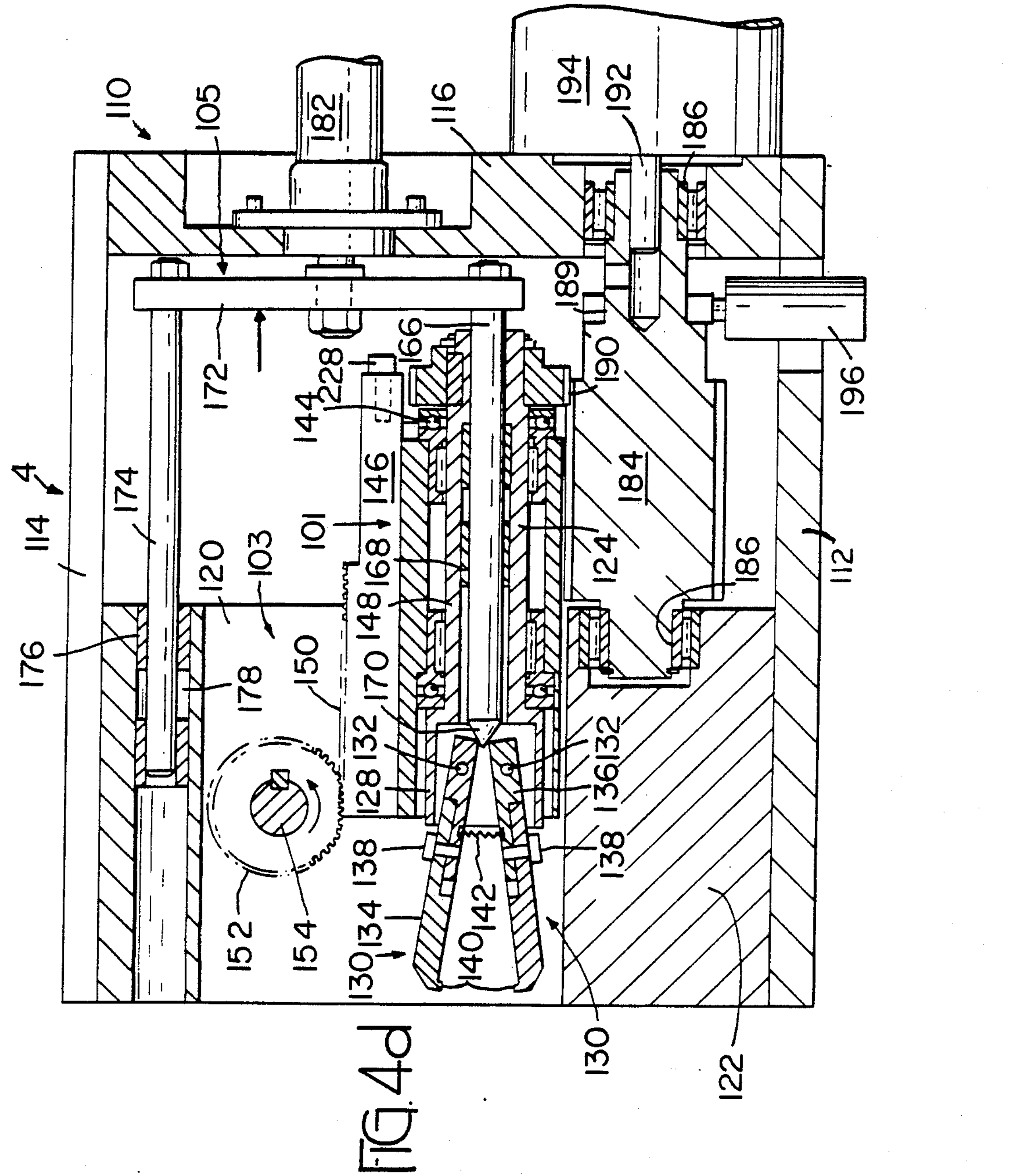
Figure 4E:
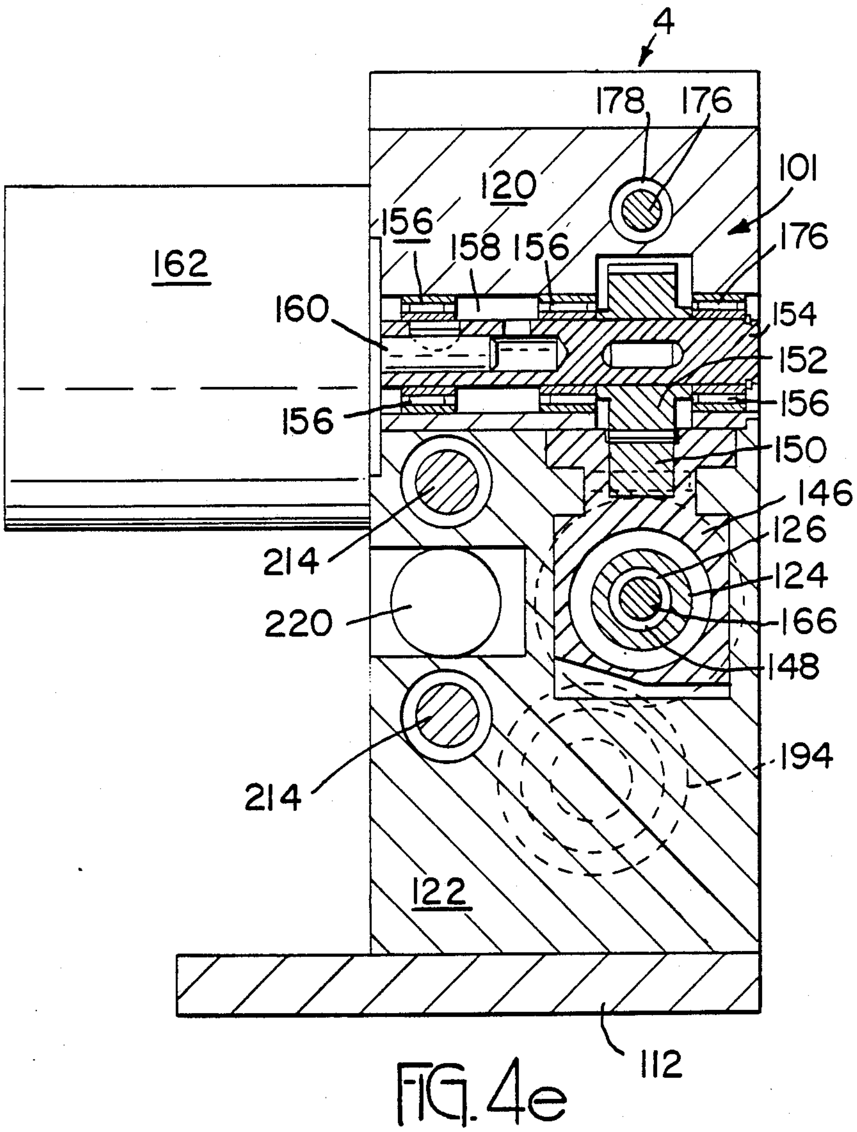
Figure 4G:
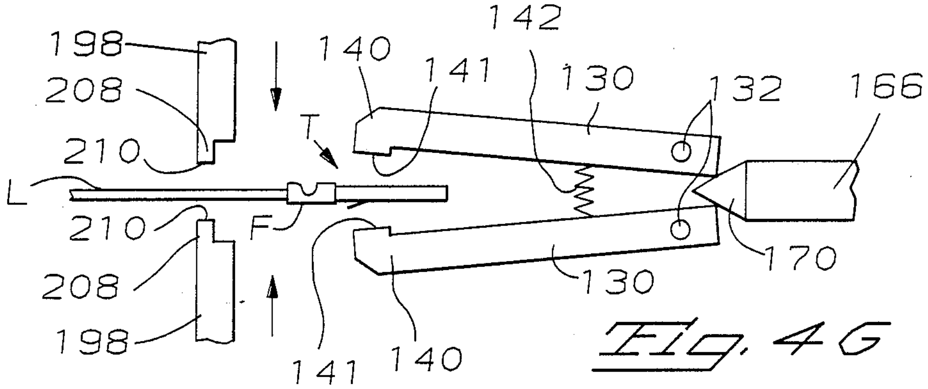
Figure 4H:
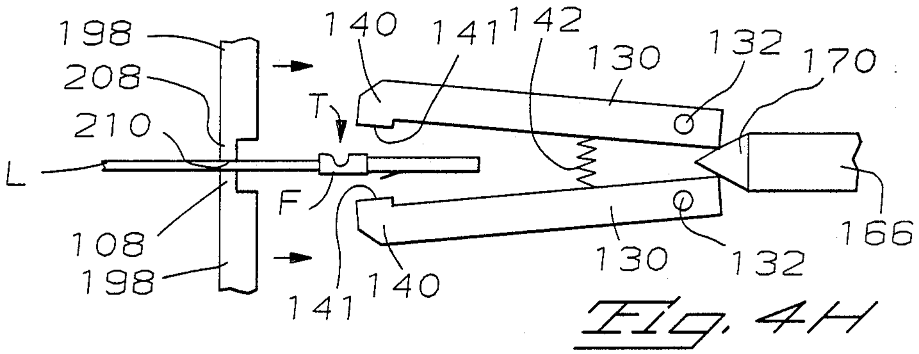
Figure 4J:
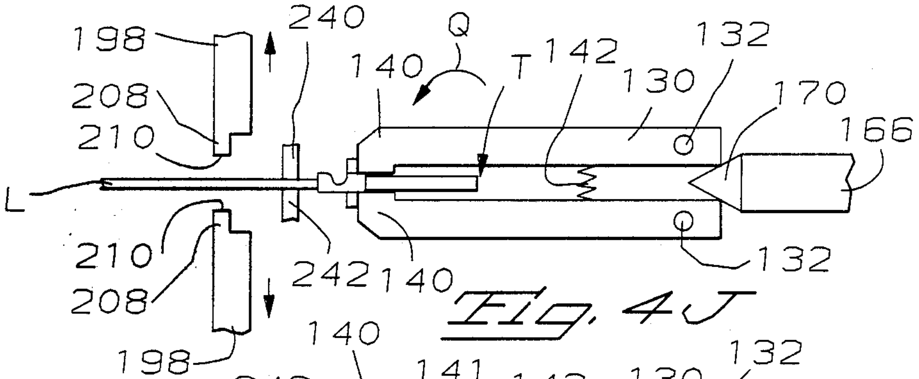
Figure 4K:
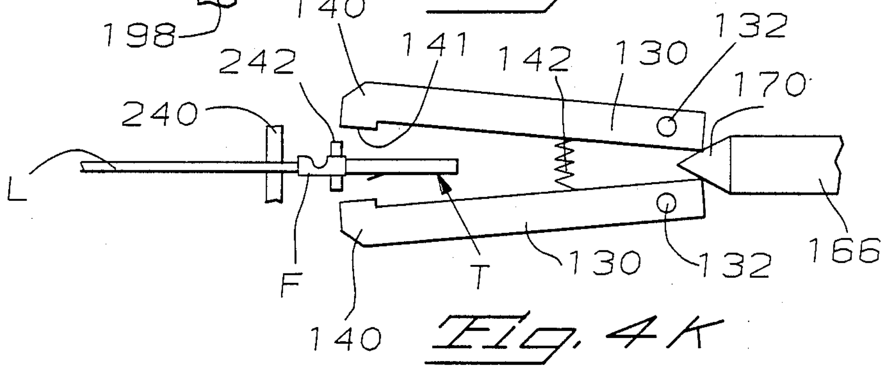
Figure 5A:
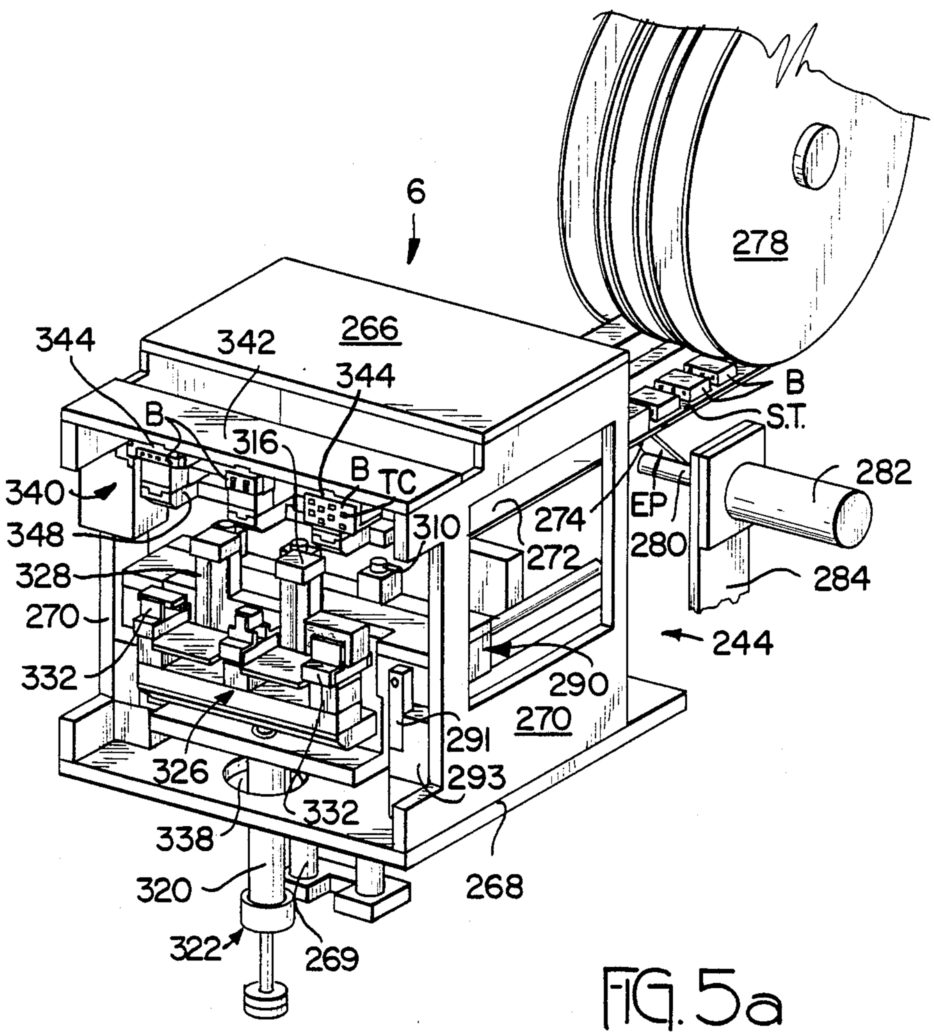
Figure 5B:
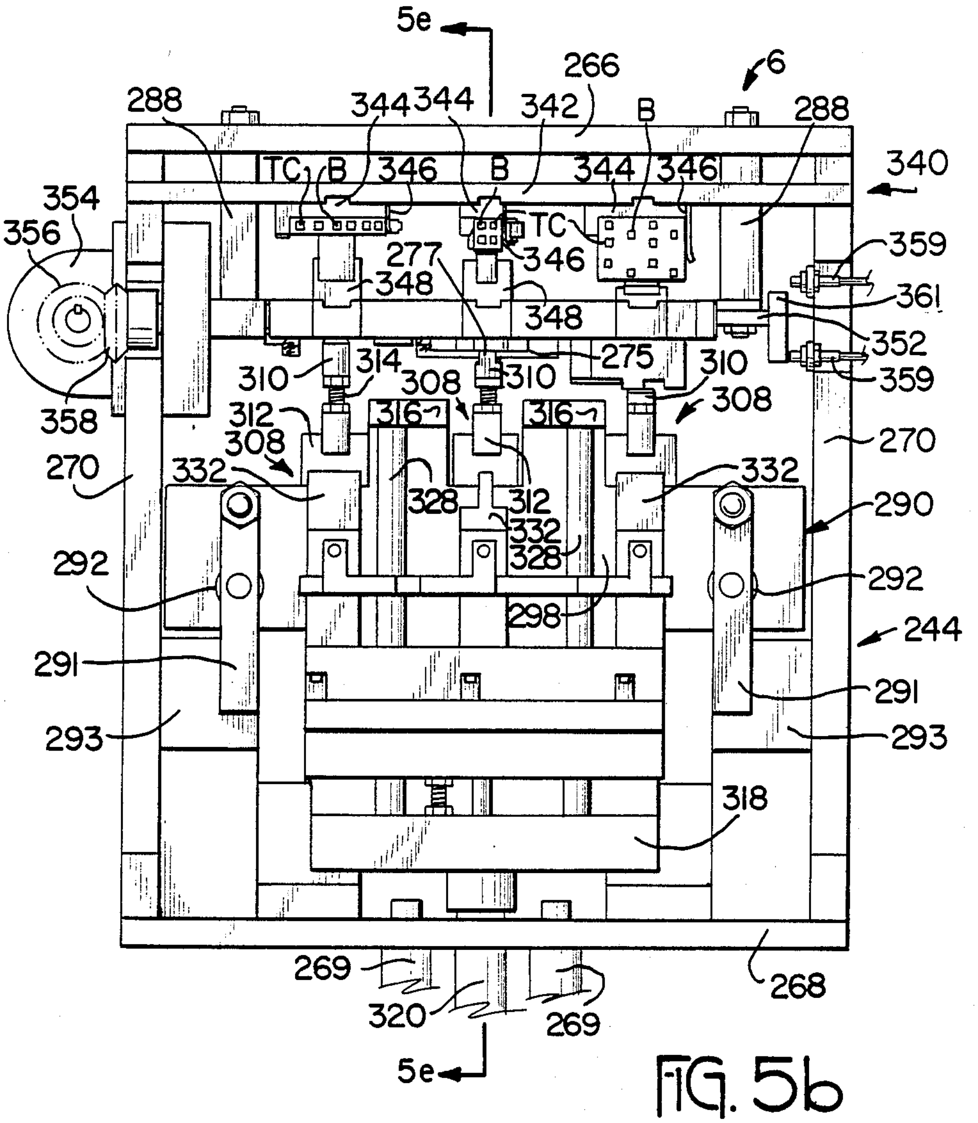
Figure 5C:
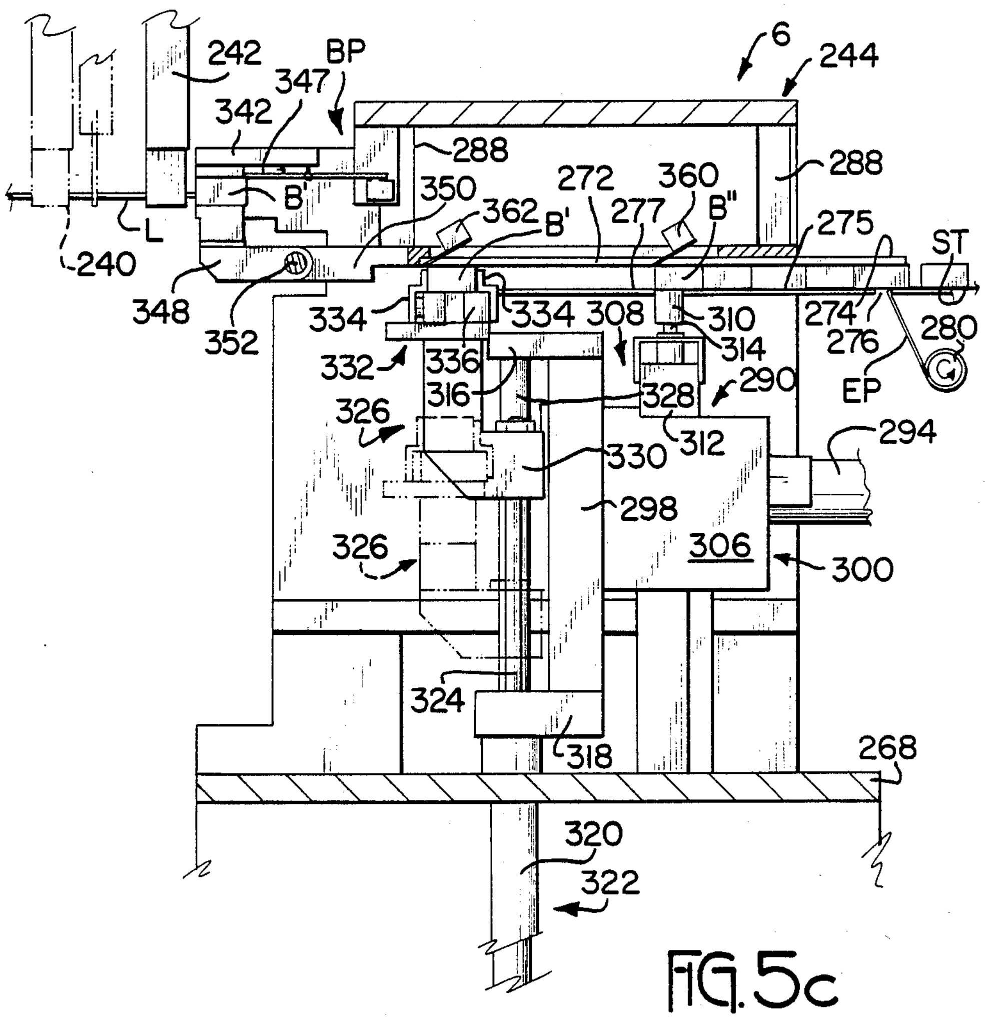
Figure 5D:
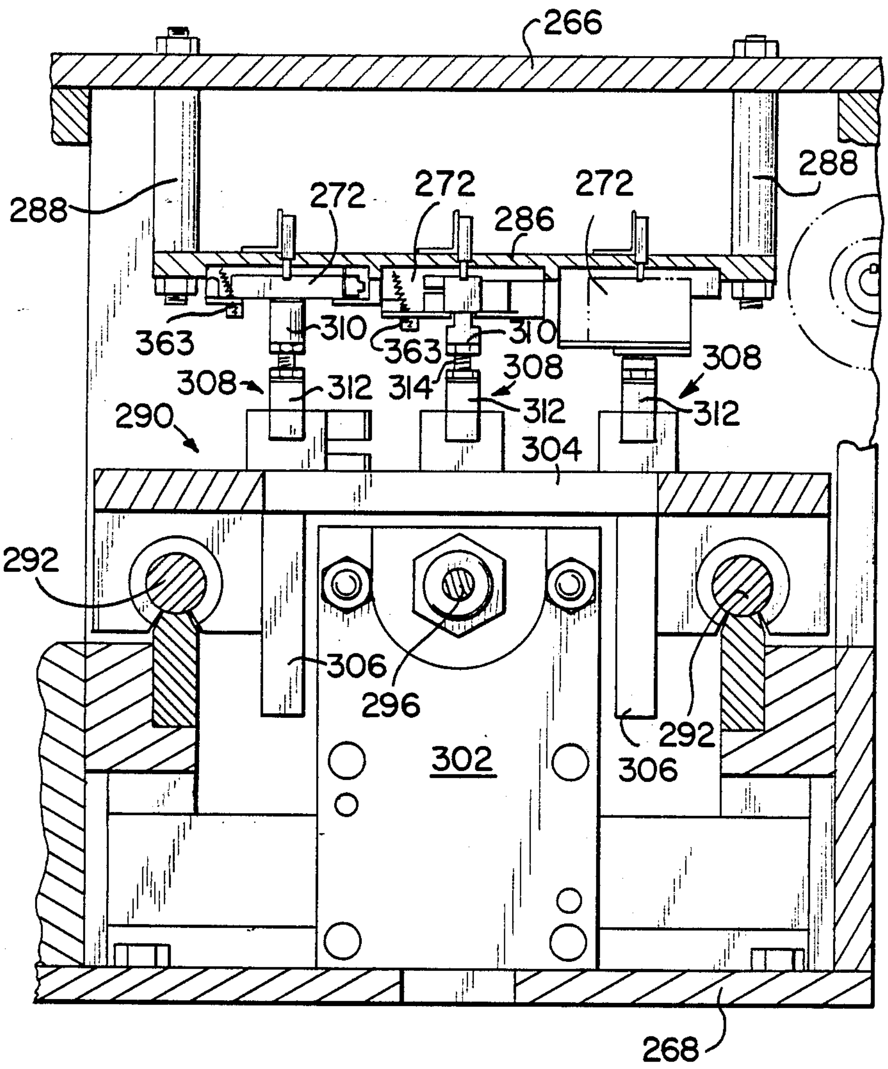
Figure 5E:
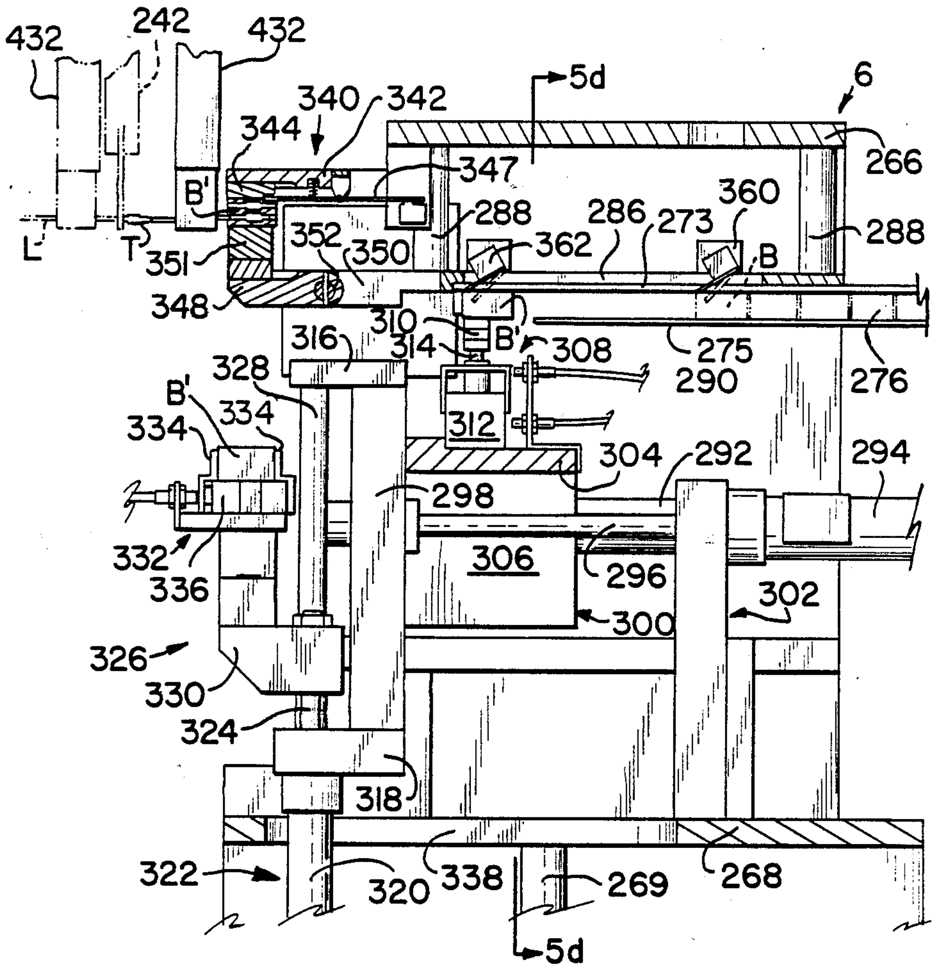
Figure 5F:
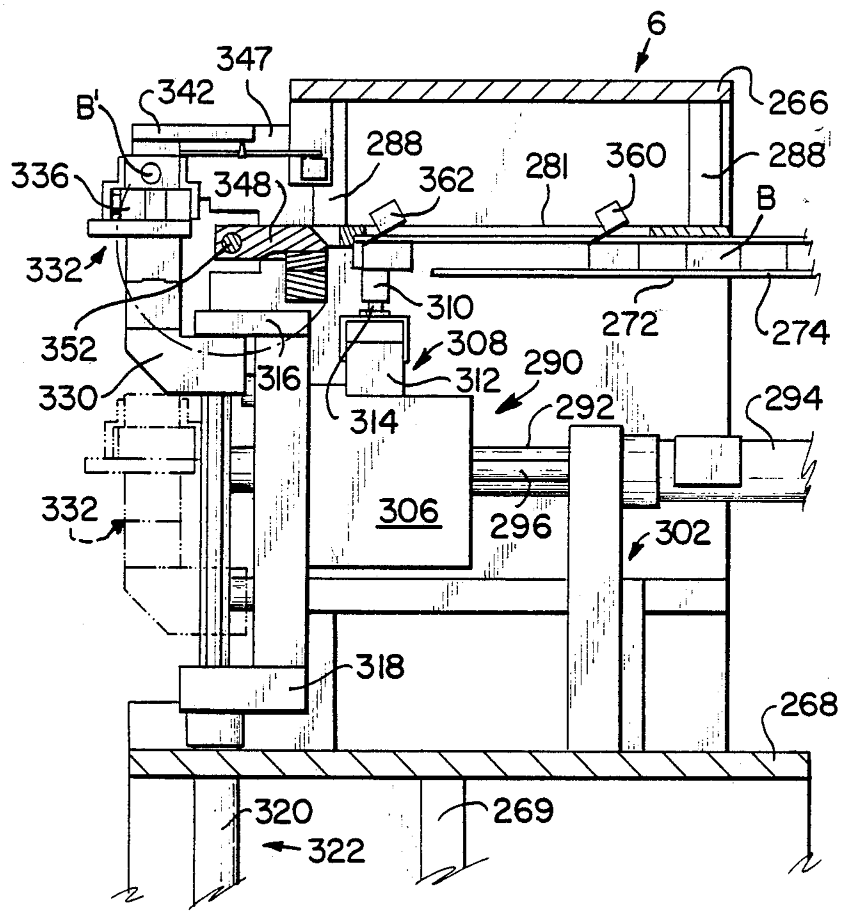
Figure 6A:
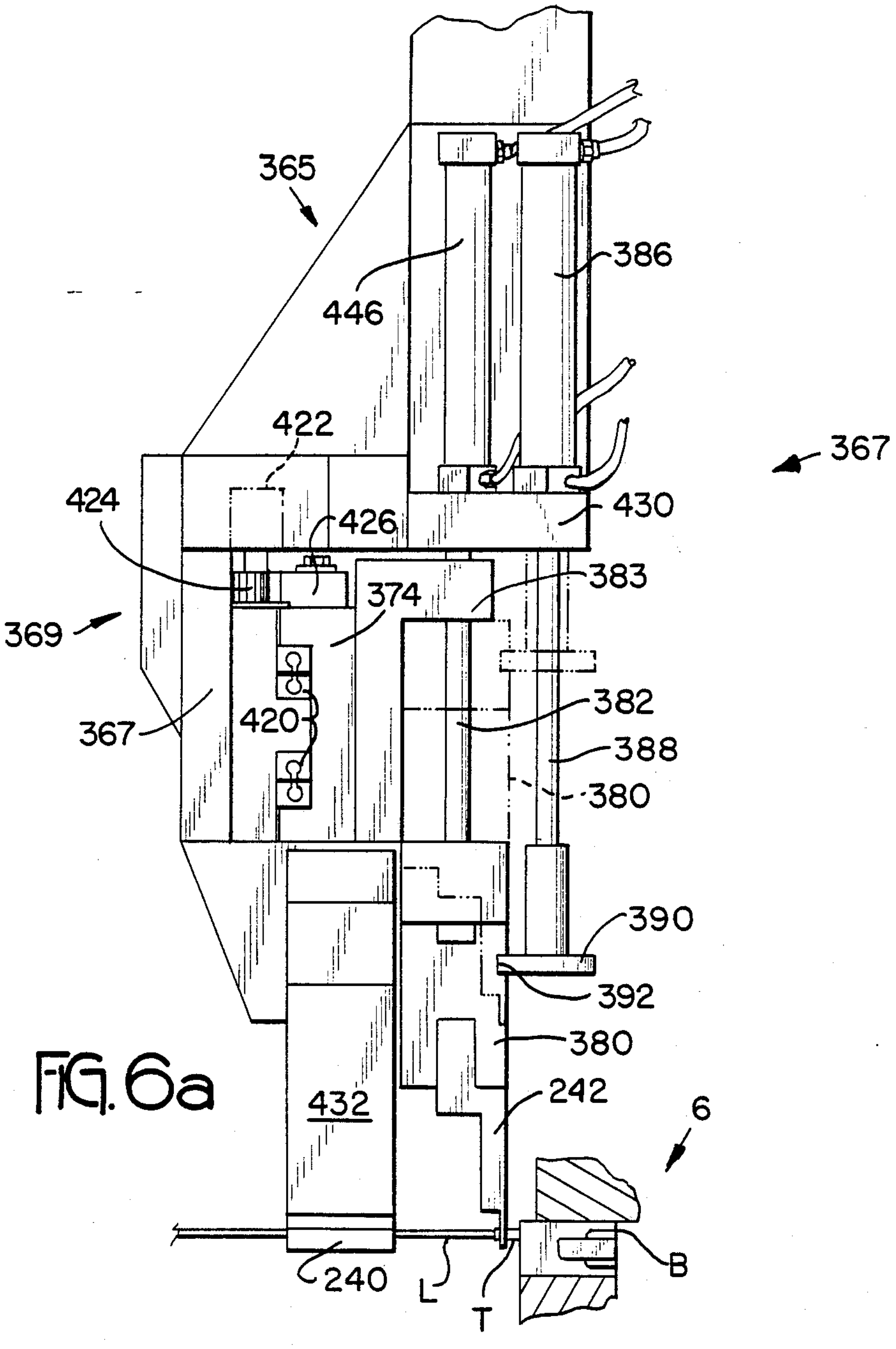
Figure 6B:
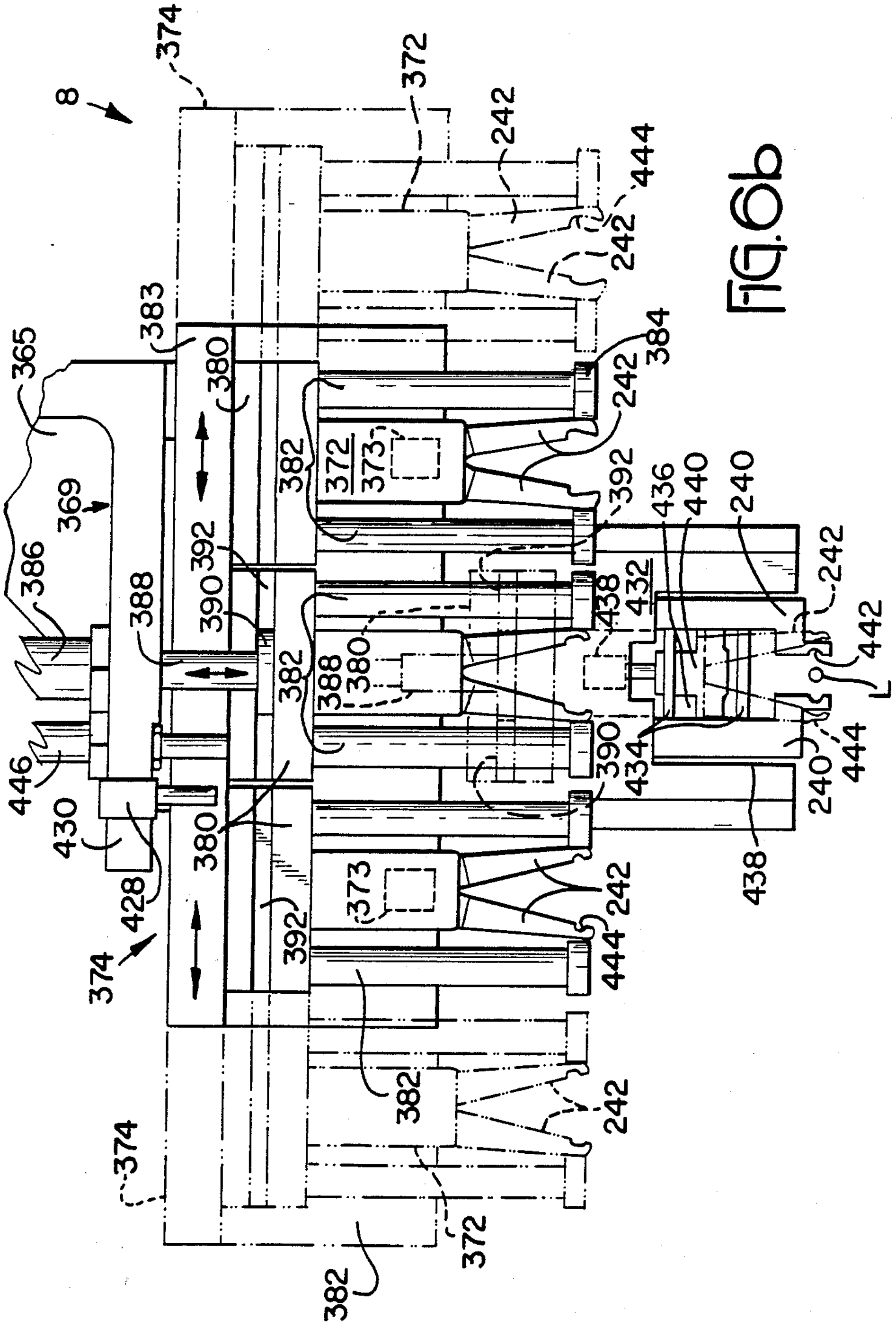
Figure 6C:
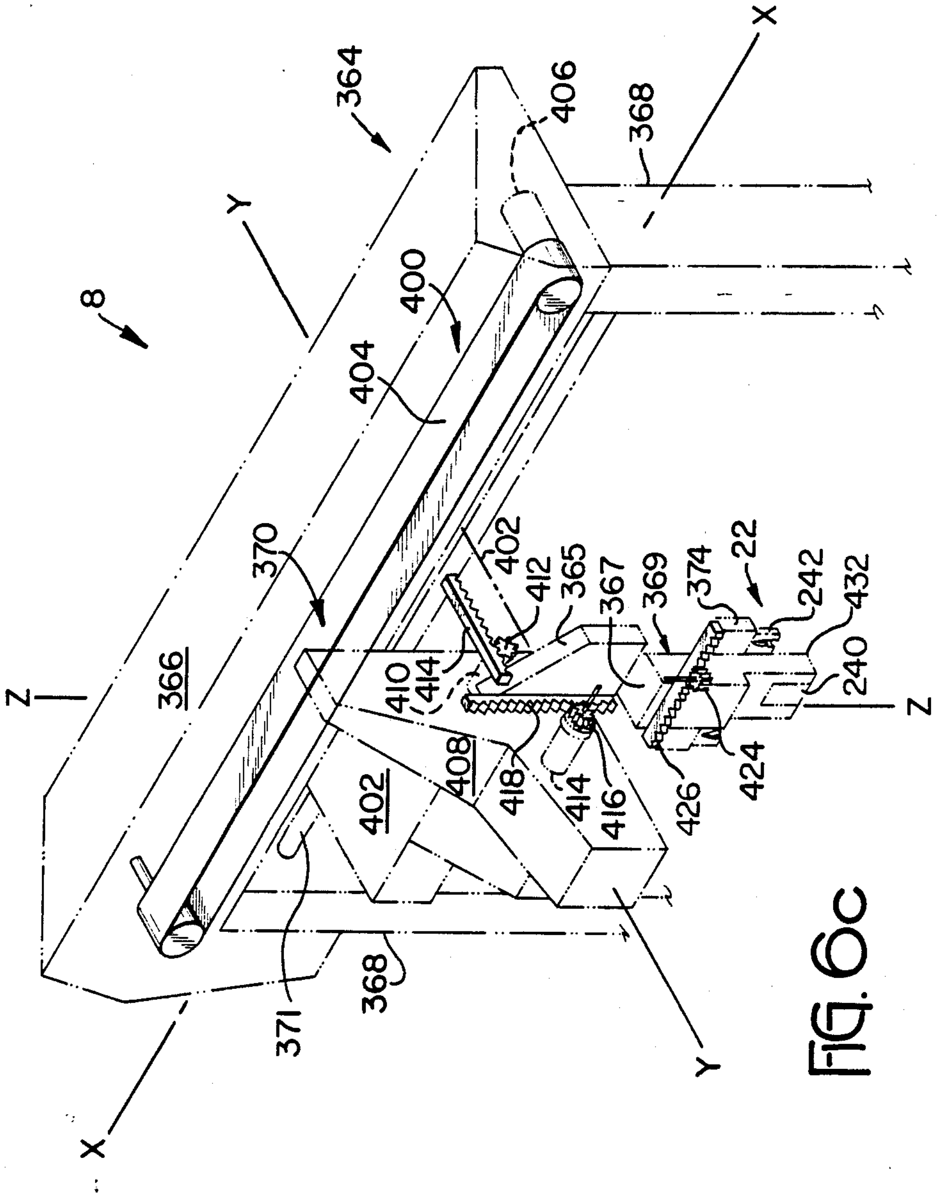
Figure 7A:
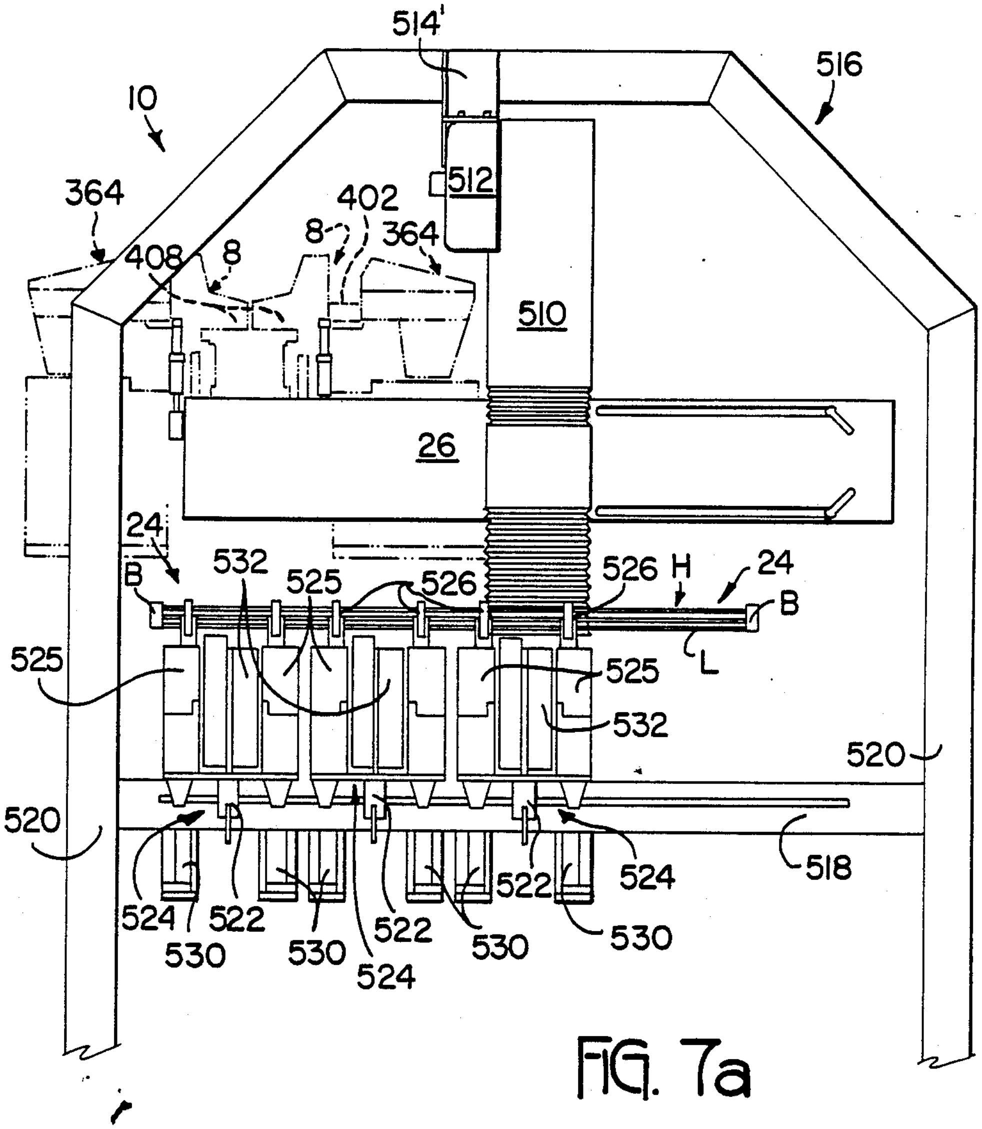
Figure 7B:
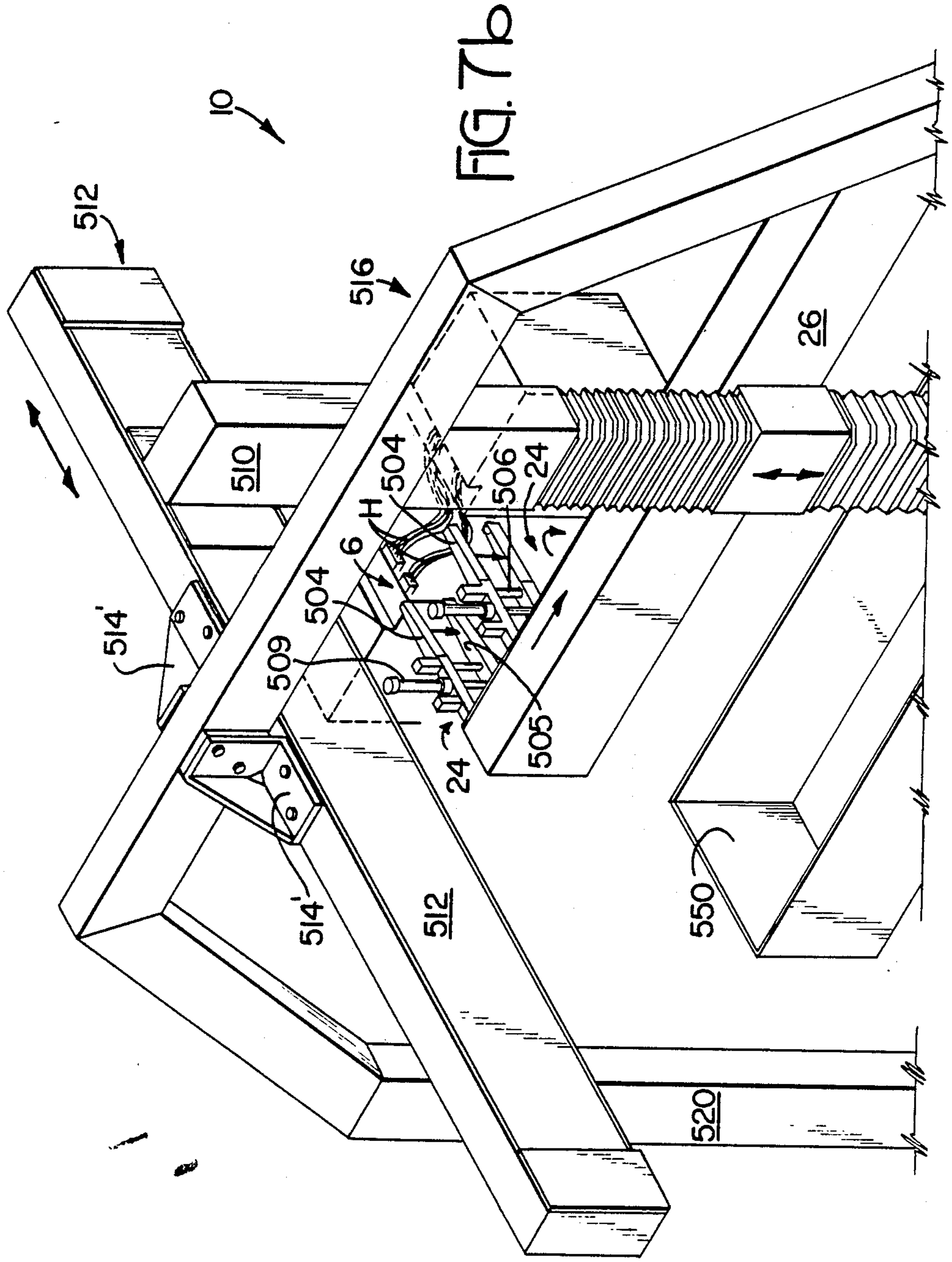
Figure 7C:
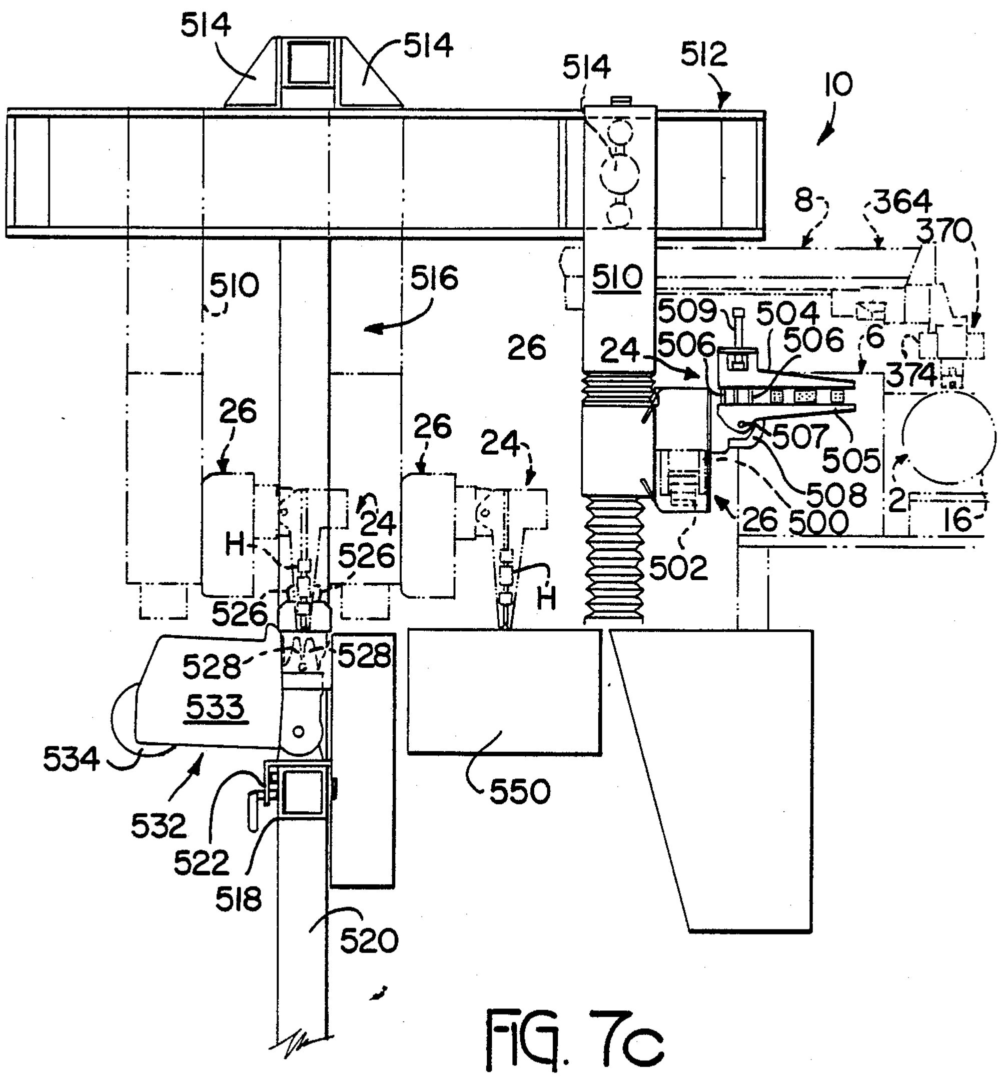
Figure 4F:
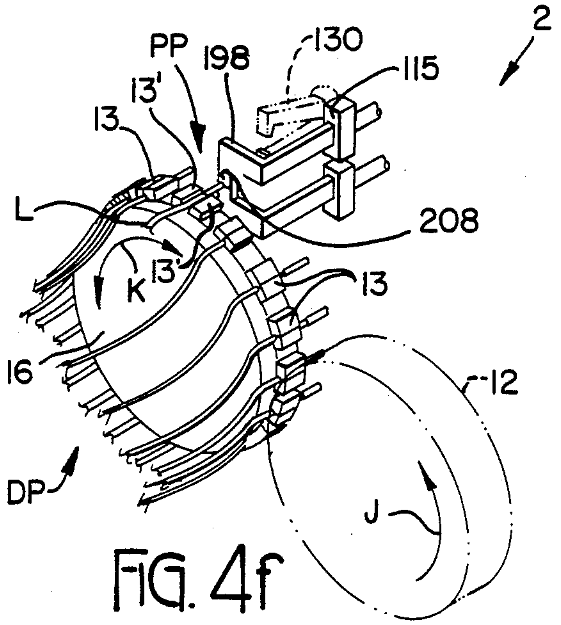

FIGS. 3C and 3C' when assembled along the lines V—V in these figures provide a plan view, shown partly in section, of the parking and sorting station;

FIG. 3D is a fragmentary plan view shown partly in section illustrating details of FIG. 3C;

FIG. 3E is a fragmentary view taken on the lines 3E—3E of FIG. 3C;

FIG. 3F is a fragmentary view of a detail of a jaw wheel of the parking and sorting station, shown partly in section;

FIG. 4A is a side view with parts omitted, of an electrical terminal positioning and rotation station of the harness making apparatus;

FIG. 4B is an end view taken on the lines 4B–4B of FIG. 4A;

FIG. 4C is a plan view of the terminal positioning and rotating station;

FIG. 4D is a sectional view, with parts omitted, taken on the lines 4D—4D of FIG. 4B;

FIG. 4E is a cross-sectional view of the terminal positioning and rotating station;

FIG. 4F is a diagrammatic isometric view illustrating the manner in which leads are fed from the lead parking and sorting station to the positioning and rotating station;

FIGS. 4G to 4H and 4J and 4K are diagrams indicating successive stages in an operating cycle of the terminal positioning and rotating station;

FIG. 5A is an isometric view of a connector block feed station of the harness making apparatus;

FIG. 5B is a front view of the station of FIG. 5A;

FIG. 5C is a diagrammatic side view shown partly in section and illustrating a first stage in the operation of the feed station;

FIG. 5D is a view taken on the lines 5D—5D of FIG. 5E;

FIG. 5E is a view taken on the lines 5E—5E of FIG. 5B and illustrating the second stage in the operation of the feed station;

FIG. 5F is a similar view to that of FIG. 5C but illustrating a third stage in the operation of the feed station;

FIG. 6A is an end view, with parts omitted, of a block loading station of the lead making apparatus;

FIG. 6B is a front view, with parts omitted, of the block loading station;

FIG. 6C is a fragmentary diagrammatic, isometric view of the block loading station;

FIG. 7A is a rear diagrammatic view of a harness ejection and bundling station of the harness making apparatus;

FIG. 7B is a fragmentary, diagrammatic isometric view of the ejection and bundling station;

FIG. 7C is a diagrammatic side view of the ejection and bundling station; and

Figure 7D:
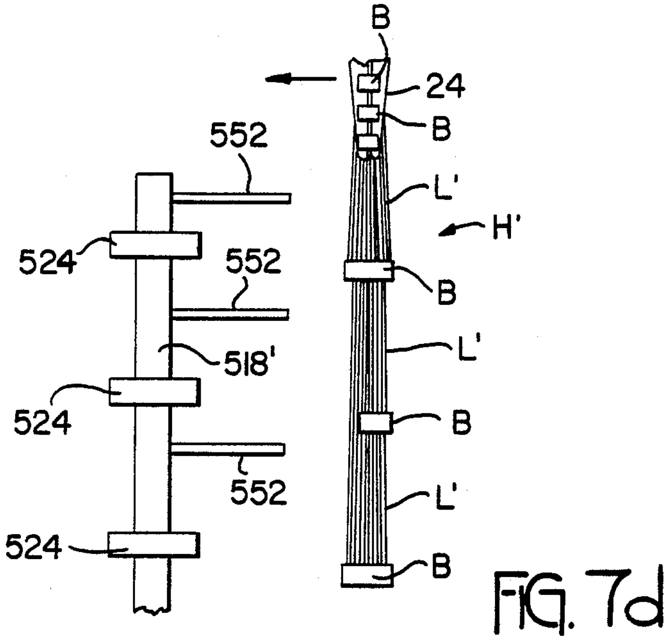

FIG. 7D is a schematic side view illustrating a modification of the ejection and bundling station.

Figure 1:
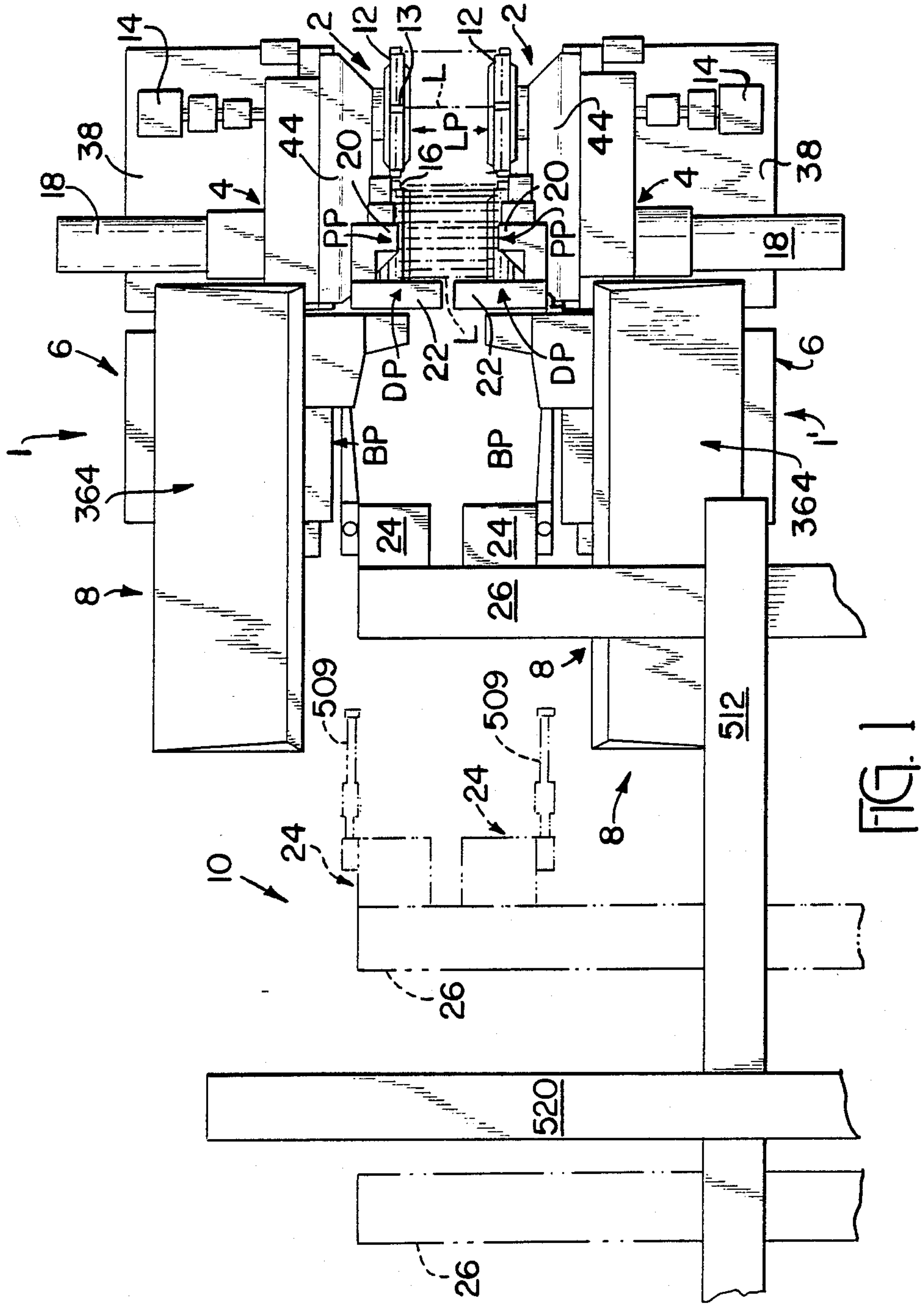

The double ended harness making apparatus and its operation will now be described in outline with reference to FIGS. 1, 2A, 2B and 3A. The apparatus comprises a pair of spaced opposed harness making units 1 and 1' each comprising an electrical lead parking and sorting station 2, an electrical terminal positioning and rotating station 4, and a connector block feed station 6, a block loading station 8 all supported on a base plate 38 on legs 9. A harness ejection and bundling station 10 is common to the units 1 and 1'. Each station 2, 4, 6 and 8 of one lead making unit is opposite to, and is aligned with, the corresponding station of the other lead making unit. The said stations are operated under the control of a microprocessor (not shown) according to a mixed harness making program. Electrical leads L (FIG. 2B) each having an electrical terminal T crimped to each end thereof are supplied sequentially to the harness making apparatus by conveyor jaws C (only one of which is shown) of a conventional lead making machine (not shown). The leads L differ from one another, for example in respect of their color, their length, the composition of their insulation, or in respect of the nature of the terminals thereon. Each station 2 comprises a pair of identical lead carriers in the form of jaw wheels 12 and 16, each of which is movable between a loading position LP and a discharge position DP. In FIGS. 1 and 2B, the wheel 12 is shown in its loading position and the wheel 16 in its discharge position. Each lead L is transferred from the jaws C by which it is held, to a pair of jaws 13 of the jaw wheel 12 of the station 2 of each of the units 1 and 1'. These two pairs of jaws 13 are opposite to one another, with the lead L depending in a loop between the wheels 12 of the units 1 and 1'. The jaw wheels 12 are rotated unidirectionally and in equal steps by unidirectional stepping motors 14, to bring each opposed pair of jaws 13, in turn, into register with conveyor jaws C, until each wheel 12 has been loaded with leads L to the extent required by the program. The jaw wheels 12 and 16, which are ganged, are then swung together through 180° (see arrows M in FIG. 3A) so that the positions of the jaw wheels 12 and 16 are reversed to bring the jaw wheels 12 to the discharge position DP and the jaw wheels 16 to the loading position LP. During the said reversal, the wheels 12 and 16 are rotated about half a revolution about their own axes, in the opposite sense to that in which the jaw wheels are swung together. This avoids tangling of the leads carried by the loaded jaw wheels, the uppermost lead of the loaded jaw wheel remaining the uppermost lead as the jaw wheels are changed over. As a result of said reversal, the jaw wheels 12 are disconnected from the motors 14 and are each connected to a second stepping motor 18, the jaw wheels 16 being disconnected from the motors 18 and connected to the motors 14, for loading. Each motor 18 is bidirectional and is rotated in steps, the lengths of which, and the directions of which are determined by the harness making program. The jaw wheels 12 are rotated about their own axes by means of the motors 18, to bring each lead L in turn, into a pickup position PP in register with a jaw assembly 20 of each of terminal positioning and rotating station 4. The jaws of the jaw wheels 12 at the pick-up position PP open, when the jaw assemblies 20 of the stations 4 have closed about the lead L. The motors 18 rotate the wheels 12 so that at each step thereof, a lead L of a predetermined color or other characteristic is presented to the jaw assemblies 20 in accordance with the lead making program. Thus the jaw wheels 12 of the units 1 and 1' may be rotated by their respective motors 18 through steps of different angular extents and in different senses, so that at least some of the leads L extending between the jaw wheels 12 will be crossed over one another during a subsequent block loading operation, if so required by the harness making program. The directions of rotation of the jaw wheels in their loading and their discharge positions are indicated by the arrows J and K (in FIGS. 3A and 3B), respectively. The jaw assembly 20 of each unit 1 and 1' grasps a respective terminal T of each lead L and rotates it through a predetermined angle, if this is required by the program, and tensions and positions the lead L and the terminal T for pick-up by terminal and lead gripping jaw means, generally referenced 22, of the respective block loader 8.

At each feed station 6, a row of connector blocks B that is to say insulating housings having terminal receiving cavities, which blocks may be of different shapes and dimensions according to the load making program, is fed, one row at a time, to a block loading position BP so that the jaw means 22 of the block loading stations 8 can each insert the terminal T of a lead which has been picked up by the jaw means 22 into a respective cavity in a block B and apply a pull test to determine whether the terminal has properly latched in its cavity. The apparatus may be programmed to sense whether the terminal has butted against the block B instead of having entered the cavity and in such case to cause the jaw means 22 to drop the lead. When the jaw wheels 12 have been exhausted of leads L, the jaw wheels 12 and 16 are swung to the positions in which they are shown in FIG. 2B so that the wheels 12 can be loaded again by the conveyor jaws C and the wheels 16 rotated by the motors 18 to feed the jaw assemblies 20 with leads L.

Figure 2A:
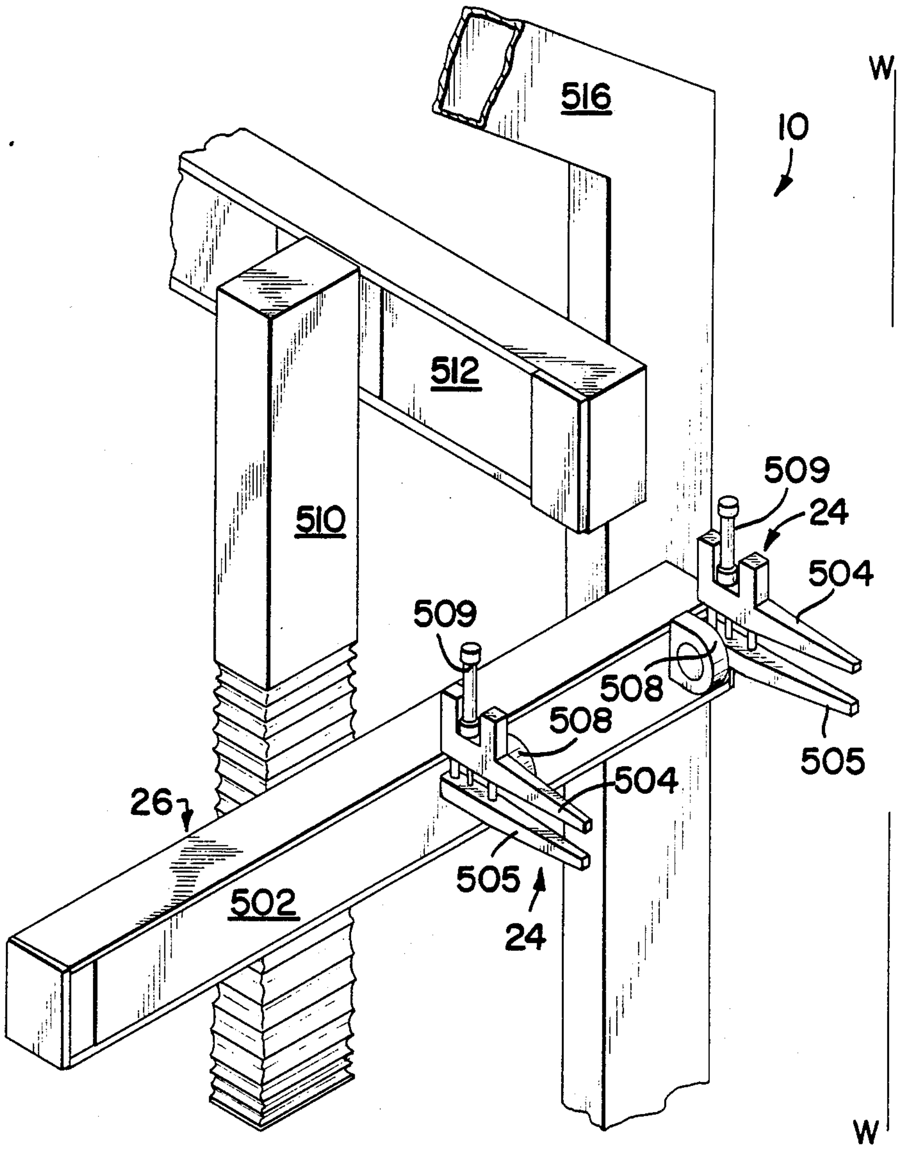
Figure 2B:
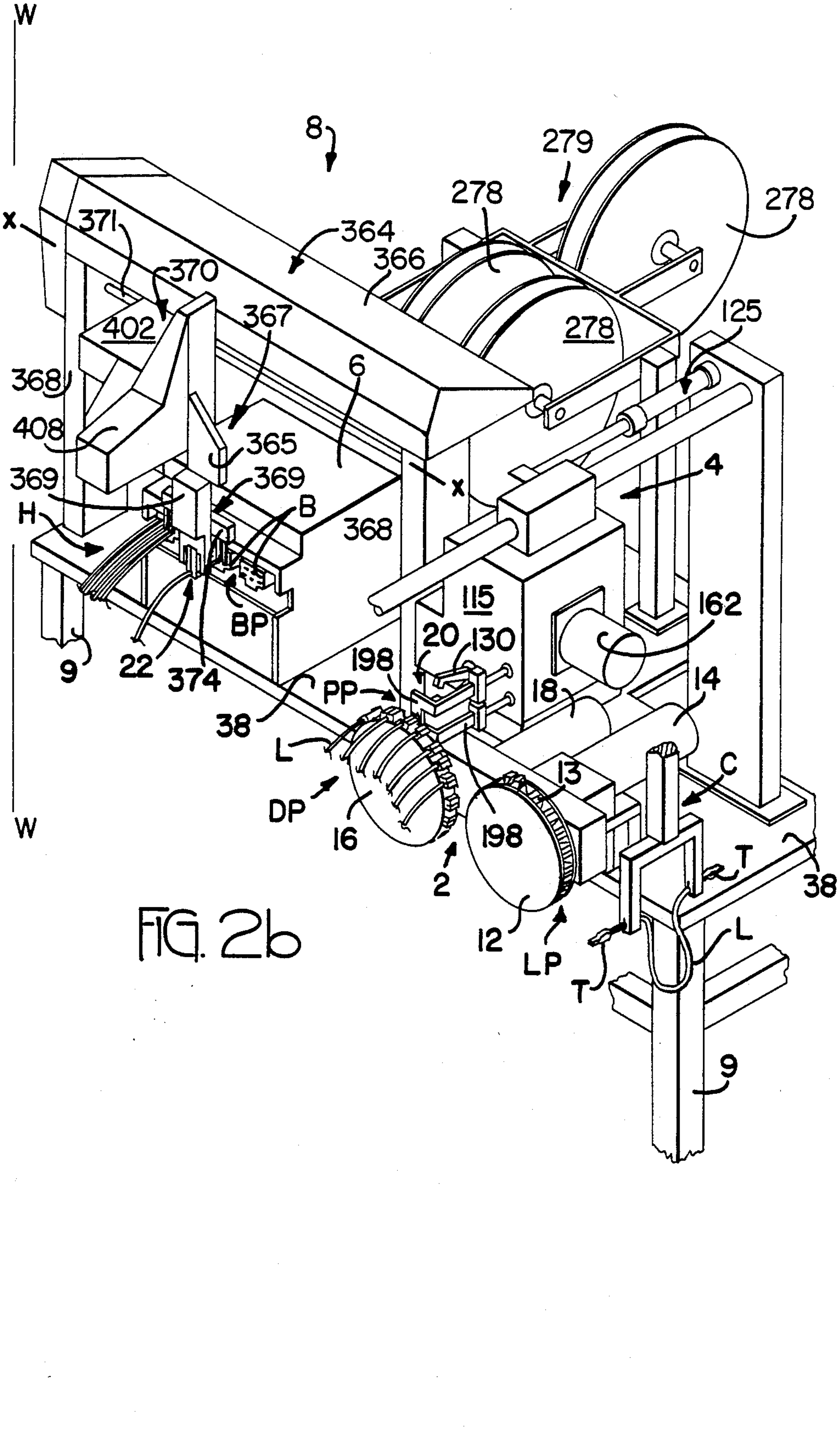

When all the cavities, required by the program, of the blocks B at the positions BP have been filled with terminals, lead grippers 24 of the lead ejection and bundling station 10 are advanced to grasp the leads L of the double ended harness H so formed, are lowered to extract the blocks B from the station 6, are swung downwardly and are opened, after having been shifted leftwardly, as seen in FIG. 2A, along a track 26 to drop the harness into a container or into lead bundling and taping means which will be described below.

A terminal crimp height and electrical continuity test station (not shown) is preferably provided upstream of each station 2 to determine whether each terminal T has been correctly crimped to its lead L, the jaws C, being programmed to drop any lead L which has failed the crimp height or continuity test.

THE PARKING AND SORTING STATIONS

One of the lead parking and sorting stations 2, which are identical, according to the present example, will now be described with particular reference to FIGS. 3B to 3F. The pairs of jaws 13 of each jaw wheel are each arranged to be opened and closed by means of a pneumatic piston and cylinder unit 28 (FIG. 3F) under the control of the microprocessor. The piston rod 30 of the unit 28 is connected to a cam plate 32, having a pair of radially outwardly converging cam slots 34, each receiving a cam follower 36, on the respective jaw 13 of the pair. The jaws 13 of the pair which by virtue of the camming mechanism just described are moved relatively linearly, are opened to receive or discharge a lead L, by advancing the piston rod 30, as shown in FIG. 3F, and are closed to grip the lead L by retracting the rod 30.

As will be apparent from FIGS. 1, 2A, 3B and 3C each parking and sorting station 2 is mounted on base plate 38 of the unit 1 or 1', as the case may be, which, as best seen in FIG. 3C, carries the stepping motors 14 and 18 and a pneumatic logic box 39 from which air lines 41 extend to the piston and cylinder units 28 of the individual pairs of jaws 13. The operation of the box 39 is controlled by the microprocessor. An electric motor 40 (FIG. 3E) for swinging the jaw wheels 12 and 16 between their loading and their discharge positions whilst rotating them about their own axes, is secured to the stationary bearing block 46, and has its spindle 42 connected to a first crown wheel 44 meshing with a second crown wheel 45 on a horizontal shaft 47 mounted in bearings 49 in the block 46, which has secured thereto a gear wheel 51 meshing with a gear wheel 53 on a shaft 55 for swinging the jaw wheels, through which shaft the lines 41 pass.

The motors 14 and 18 which have driving shafts 58 and 59, respectively, are provided with signal emitters 48 and 50, respectively, these being under the control of the microprocessor.

On the shaft 55 which is secured to a rotary bar 57 in which the jaw wheels 12 and 16 are mounted for rotation, is a locking wheel 52 which is engageable by a locking pawl 54 which is actuable by a pneumatic drive unit 56 under the control of the microprocessor. The locking pawl 54 is actuable to lock the wheel 52 and thus the shaft 55 in its two angular positions in one of which the jaw wheel 12 is in its loading position, and the jaw wheel 16 is in its discharge position, and in the other of which, the positions of the jaw wheels 12 and 16 are reversed.

On the shaft 58 of the motor 14 is a further locking wheel 60 which is engageable by a further locking pawl 62 under the control of a further pneumatic drive unit 64 controlled by the microprocessor. The pawl 62 is actuable to lock the shaft 58 in each of its angular positions. Each of the shafts 58 and 59 has secured to its lower (as seen in FIG. 3C) end, a pinion 59' which as best shown in FIG. 3B meshes with a jaw wheel drive gear wheel 66 which has therein a circular array of bores 68 each for receiving a respective stud 70 on a head 74 of a drive shaft 72 of a respective one of the jaw wheels 12 and 16. The head 74 is axially slidable in the shaft 72 and is urged away from the block 46 by a spring 76, acting through a slide 78 in the bar 57, which engages a pinion 88 on the head 75 and which is guided by a slide rod 74, as best seen in FIG. 3D. Mounted to each side of the block 46 is a solenoid 80 having a plunger 82 which is engageable in a bore 84 in the bar 57 to retain the later against rotation in each angular end position of the bar 56, and to drive a rack 86 in the bore 84, which meshes with the pinion 88 for driving the slide 78. When the plunger 82 is advanced, the corresponding head 74 is driven towards the block 46 against the action of the spring 76, to engage the studs 70 on the head 74 in the bores 68. Thus, when the right hand, as seen in FIG. 3C, plunger 82 is advanced, with the jaw wheel 12 or 16, in its loading position LP, the motor 14 is drivingly connected to that jaw wheel, and when the left hand (as seen in FIG. 3C) plunger 82 is advanced, the corresponding head 74 is moved towards the block 46 to engage the studs 70 of the former, in the bores 68 in the shaft 59 of the motor 18 so that the motor 18 drives the jaw wheel 12 or 16, as the case may be, when it is in its discharge position DP.

The shaft 55 has thereon a gear wheel 90, meshing with gear wheels 98 on stub shafts 102 each provided with a further gear wheel 104. Each gear wheel 104 meshes with the gear wheel 76 of the respective head 74 when the latter is in its retracted, FIGS. 3C and 3D, position. When the jaw wheel 12 or 16, as the case may be, is to be moved from its loading to its discharge position, or vice versa, the heads 74 are retracted by their respective solenoids 80 and the motor 40 is actuated to rotate the bar 57 through 180 degrees. As each jaw wheel 12 or 16, as the case may be, which has been loaded with leads L in its loading position LP, to the extent required by the program, is being swung to its discharge position, the rotation of the shafts 55 of the stations 2 of the units 1 and 1' causes, through the gear wheels 90 and 98, shaft 102, gear wheel 104 and pinion 77, each of the jaw wheels 12 and 16 to be rotated through a single revolution about its own axis in the same direction as the respective shaft 55, so that the leads L of the loaded jaw wheels of units 1 and 1', do not tangle as the bars 56 are swung through 108 degrees to change the jaw wheels over.

THE TERMINAL POSITIONING AND ROTATING STATIONS

One of the terminal positioning and rotating stations 4, which, according to the present example, are identical, will now be described with reference to FIGS. 4A to 4K. Each station 4 is slidably mounted on the respective base plate 38 for adjustment towards and away from the adjacent pick-up position PP, by means of a piston and cylinder pneumatic unit 125 (FIG. 2B), under the control of the microprocessor. As shown in FIGS. 4A to 4E, each station 4 comprises a terminal rotating gripper assembly generally referenced 101, a stroke-slide assembly generally referenced 103, a gripper jaw operating assembly generally referenced 105, and a lead tensioning assembly generally referenced 106.

The said assemblies are supported by a frame 110 comprising a base plate 112, a top plate 114, and a rear end plate 116, superposed support blocks 120 and 122 being secured together between the plates 112 and 114 by means of screws 123. The frame 110 has a forward end 115 which faces towards the jaw wheel 12 or 16, as the case may be, when that jaw wheel is in its discharge position, as shown in respect of the jaw wheel 16 in FIG. 2B and 4F.

The gripper assembly 101 comprises a gripper jaw support sleeve 124 having a through bore 126 from the forward end of which projects a hood 128 in which are pivotally mounted two opposed terminal gripping jaws, 130, each to swing about a horizontal pivot pin 132 in the hood 128, the pins 132 extending through the jaws 130 proximate to their rear ends. Each jaw 130 comprises a forward portion 134 and a rearward support position 136 through which the respective pivot pin 132 passes, and to which the forward portion 134 is exchangeably secured by means of a screw 138. At its forward end, each portion 134 has a terminal gripping flange 140 projecting towards the terminal gripping flange 140 of the other jaw, and having an inwardly facing terminal gripping surface. The jaws 130 are urged towards an open position by means of a compression spring 142 acting between the portions 136 thereof. The sleeve 124 is mounted for rotation about its longitudinal axis, which is a horizontal axis, in bearings 144 secured in a bore 148 of a stroke slide 146, in which bore 148 the sleeve 124 is accommodated. The stroke slide 146 which is part of the stroke slide assembly 103, is provided with a rack 150 on its upper surface, which meshes with a pinion 152 keyed to a shaft 154 rotatably mounted in the block 120 on bearings 156 secured to the walls of a bore 158 in the block 120, as shown in FIG. 4E. The shaft 154 is operatively coupled to the spindle 160 of a stroke slide drive electric motor 162 secured to the block 120. The motor 162 is arranged to drive the stroke slide 146 from left to right (as seen in FIG. 4D and vice versa, by way of the shaft 154, pinion 152, and rack 150, over a range of displacement.

The gripper jaw operating assembly 105 comprises a jaw opening and closing spigot 166 which is slidable axially of its length in the sleeve 124 in bearings 168 and which is provided at its forward end, with a conical actuating tip 170, engageable between the portions 136 of the jaw 130 rearwardly of the pivot pins 132. The spigot 166 is secured at its rear end, to one end of a yoke 172, to the opposite end of which is secured a guide rod 174 mounted to slide in bearings 176 secured to the walls of a bore 178 in the block 120. The yoke 172 is connected between the spigot 166 and the guide rod 174 to the piston rod 180 of a pneumatic piston and cylinder spigot drive unit 182 secured to the plate 116.

The unit 182 is actuable to drive the spigot 166 between an advanced position, in which the tip 170 of the spigot 166 engages between the portions 136 of the jaws 130 to force them into a closed position against the action of the spring 142 and a retracted position in which the tip 170 is withdrawn from between the portions 136 to a sufficient extent to allow the jaws 130 to open under the action of the spring 142.

The terminal rotating assembly 101, also comprises an elongate gear wheel 184 which is mounted for rotation in the plate 116 and block 122 on bearings 186 and meshes with a pinion 188 keyed to the rear end of the sleeve 124, the pinion 188 being slidable lengthwise of the teeth 190 of the gear wheel 184 by means of the drive motor 162. The gear wheel 184 is operatively connected to the shaft 192 of a terminal rotation drive stepping electric motor 194 fixed to the plate 116. The motor 194 is actuable to rotate the sleeve 124 by way of the gear wheel 184 and pinion 188 so as to rotate the jaws 130 through any desired angle according to the program of the microprocessor. The angle of rotation of the gear wheel 184 and thus of the jaws 130 is arranged to be monitored by means of a sensor 196 secured to the plate 112 and engaging a cam surface 189 of the gear wheel 184.

The lead tensioning assembly 106, which is best seen in FIGS. 4A, 4B and 4D comprises a pair of wire gripping jaws 198 each mounted on a piston rod 200 of a pneumatic piston and cylinder unit 202 and being slidable there towards against the action of a lead cushioning spring 204. The lower, as seen in FIG. 4B, jaw 198 is provided with a terminal guide plate 205. Each jaw 198 extends from its piston rod 200 leftwardly, as seen in FIG. 4B, and terminates in a cranked wire gripping portion 206 having a vertically extending free end portion 208 formed with an arcuate wire gripping surface 210, these surfaces being aligned with the wire gripping surfaces of the jaws 130, when the jaws 130 and 198 are in a closed position. The jaws 130 and 198 constitute the jaw means 22 referred to above with reference to FIG. 2B.

Each unit 202 is mounted to a carrier plate 212, the plates 212 slidably receiving support and guide rods 213 fixed to the blocks 120 and 122, as shown in FIG. 4A. Each plate 212 has secured therein a drive rod 214 extending slidably through the block 222, as best seen in FIG. 4E, the rods 214 being connected at their ends remote from the plates 212, by a yoke 216 which is secured to the rods 214 by screws 215 and to the piston rod 218 of a wire tensioning jaw drive piston and cylinder unit 220 which is actuable to move the plates 212 between an advanced position shown in full lines in FIG. 4A and a retracted position shown in broken lines therein. The advance movement of the yoke 216 and thus of the plates 212 and the jaws 198 is limited by stops 222 secured in the blocks 120 and 122, respectively, and which are engageable with end parts 224 of the yoke 216, the retractile movement of the yoke 216 and thus of the plates 212 and the jaws 198 being limited by a stop 226 projecting from the plate 16 for engagement with the central part of the yoke 216.

As shown in FIG. 4C, the stroke slide 146 has secured to its end nearest to the plate 116, by means of a screw 228, a switch actuating bracket 230 having thereon a switch actuating cam 232, for actuating a switch 234 when the stroke slide 146 is in an extreme retracted position, to stop the motor 162.

The piston and cylinder units 182, 202 and 220 and the stepping motors 162 and 194 are operated through the agency of the microprocessor and thus according to the harness making program.

With the jaws 130 of each station 4 in an open and advanced position (FIG. 4G) in which the terminal gripping surfaces 141 thereof lie beyond the forward end 115 of the frame 110, the stroke slide 136 being in its forward position and the jaws 130 being in an open position, that is to say with the spigot 166 retracted by means of the unit 182 to allow the spring 142 to open the jaws 130, a lead L is located between the open jaws 130 of the station 4 of each unit 1 and 1', by means of the jaw wheels 12 or 16, as the case may be, when these are in their discharge position. Each terminal T is guided between the jaws 130, of the respective station 4, with the aid of the guide plate 205. The piston rod 218 of the piston and cylinder unit 120 of each station 4 is in its retracted position, so that plates 212 and thus the jaws 198 are in their fully advanced position, the piston rods 200 of the units 202 also being in a retracted position. The units 202 are now actuated to close the gripping surfaces 210 of the jaws 198 about the lead L (in FIGS. 4F and 4H) and the piston and cylinder unit 220 is actuated to advance its piston rod 218 so that the plates 212 and thus the jaws 198 of the station 4 of each unit 1 and 1' are retracted to tension each end portion of the lead L between the still closed jaws 198 of the respective station 4 and the jaws 13 of the respective jaw wheel 12 or 16, as the case may be. The spigot 166 of each station 4, is now advanced by its piston and cylinder unit 182, so that the tip 170 of the spigot 166 forces the jaws 130 to their closed position about the crimping ferrule F of the respective terminal T as shown in FIG. 4J. The jaws 198 are now opened by means of the units 202 and, if it is required by the program, the motor 194 of each station 4 is actuated to rotate the sleeve 124, by way of the gear wheel 184 and pinion 188, to an extent to rotate the terminal T through the required angle as indicated by the arrow Q in FIG. 4J. Each terminal T of the lead L, having been so accurately positioned by means of the jaws 198 and 130, a lead clamp comprising lead gripping jaws 240, of each jaw means 22 of the stations 6 is closed about the lead L to retain the terminal in its existing angular position and a terminal clamp comprising terminal gripping jaws 242, of each of the jaw means 22 of the stations 6 is closed about the lead L to retain the terminal in its existing angular position and a terminal clamp comprising terminal gripping jaws 242, of each of the jaw means 22 of the stations 6 is closed about the terminals T. The spigot 166 of each station 4 is then retracted to open the jaws 130 as shown in FIG. 4K and the lead L is then transferred by the jaws 240 and 242 to a block loading position.

As shown in FIG. 4D, the stroke slide 146 can be retracted so that the jaws 130 are fully received within the frame 110. The sensor 196 serves to signal to the microprocessor, the angle of the terminal T, about its own axis, for checking against the program.

THE BLOCK FEED STATIONS

The block feed stations 6, which are identical, according to the present example, will now be described with reference to FIGS. 5A to 5F. Each station 6 comprises a frame 244 having a top plate 266, a base plate 268, raised above the base plate 38 on adjustable supports 269, and side plates 270. Supported in the frame 244 at a connector block entry level, are three parallel constantly spaced connector block tracks 272 for slidably receiving connector blocks B, which as best seen in FIG. 5B, are of different shapes and sizes and each of which is formed with a plurality of electrical terminal receiving cavities TC arranged in one or more rows and which may be such as to receive the terminals T in different angular orientations about their longitudinal axes. Each track 272 has an upper wall 273 and a lower wall 275, having a longitudinal slot 277. Each track 272 has a portion 274 projecting rearwardly of the frame 244 and being provided with a tape receiving slot 276 (FIG. 5C). Each track 272 receives connector blocks B from an individual storage reel 278 rotatably supported behind the station 6 in a frame 269 as shown in FIG. 2B. A block supporting tape SP to one side of which is adhered a series of spaced identical blocks B is wound about each storage wheel 278. An end portion EP of each tape ST which has been inserted through the respective slot 276, is wound about an individual winding spool 280 (only one of which is shown), driven by an electric motor 282 mounted on a bracket 284 (FIG. 5A) secured to the base plate of the harness making unit 1 or 1', as the case may be. As the motor 282 rotates its spool 280 intermittently, under the control of the microprocessor, a block B at a time is forced into its track 272 as the tape SP is wound onto the spool 280.

As best seen in FIG. 5D, the tracks 272 are supported by a cross plate 286 supported by bolts 288 depending from the top plate 266. A carriage 290 is mounted for horizontal reciprocating movement forward and rearwardly in the frame 244 (FIGS. 5C and 5E), on slide rods 292, by means of a pneumatic piston and cylinder unit 294 having a piston rod 296 secured to a forward cross plate 298 of the carriage 290, rearward movement of the carriage 290 being limited by the engagement of stop bars 291 thereon with blocks 293 on the frame 244. There extends rearwardly from the plate 298, towards a support structure 302 for the unit 294, a gantry 300 having a top wall 304 and spaced sidewalls 306 which straddle the piston rod 296 and which also straddle the structure 302 in the rearmost position of the carriage 290 (FIG. 5C). On the wall 304 are three evenly spaced plunger units 308 each comprising a plunger 310 drivable in vertical reciprocating motion, in accordance with the microprocessor program by means of a pneumatic piston and cylinder unit 312 having a piston rod 314 carrying the plunger 310.

The plate 298 has upper and lower forwardly projecting arms 316 and 318 respectively, the cylinder 320 of a connector block gripper drive piston and cylinder unit 322 supported on the base plate 38 on an adjustable support 321, being secured to the arm 318. The piston rod 324 of the unit 322 passes through the arm 318 and is secured to a connector block gripper assembly 326 which is slidable in reciprocating motion under the control of the microprocessor, along vertical guide rods 328 fixed to the arms 316 and 318 of the plate 298. The assembly 326 comprises a support block 330 carrying three constantly spaced (as best seen in FIG. 5A) connector block grippers 332 each having a pair of outwardly projecting gripper jaws 334 which are movable between an open, block receiving position, and a closed, block gripping position, by means of a pneumatic piston and cylinder unit 336.

The plate 268 is formed with a slot 338 (FIGS. 5A and 5E) receiving the cylinder 320 and allowing it to move forwardly and rearwardly with the slide 290.

A support structure 340 projecting forwardly of the frame 244, for supporting the blocks B in their block loading forward positions, comprises a top plate 342 to which are exchangeably secured three evenly spaced connector block holders 344 (best seen in FIG. 5B) each individually shaped and dimensioned to receive a particular one of the blocks B and each being provided with a block retention spring 346 which, as will be apparent from FIG. 5B serves to retain the block B releasably in its holder 344. The structure 340 further comprises three evenly spaced connector block clamping arms 348 pivoted to a lower wall 350 of the structure 340 by means of a common pivot rod 352, for swinging movement between a connector block gripping position and a connector block receiving position, as will be apparent from FIGS. 5E and 5F, each arm 348 having an exchangeable connector block gripping pad 351. The arms 348 are driven between these positions by means of an electric motor 354 secured to the left hand (as seen in FIG. 5B) side plate 270. The motor 354 acts upon the rod 352 through a crown wheel 356 on the spindle of the motor 354 and a crown wheel 358 fixed to the rod 352. The end angular positions of the rod 352 are detected by proximity switches 359 in cooperation with an eccentric member 361 on the rod 352 and are signalled to the microprocessor.

Each connector block B is fed to its block loading position at the station 6 in the following manner. As the respective spool 280 is rotated by means of its motor 282, the respective tape ST is pulled from its reel 278 and the leading connector block B is forced into the respective track 272. The motor 282 continues to rotate until the leading block B′ trips a first limit switch 360 projecting into the track 272, whereby the motor 282 is stopped. With the carriage 29 in its rearward, retracted, position in which it is shown in FIG. 5C, the plungers 310 are raised by their units 312 each to engage a leading connector block B′ through the slot 277 in the lower wall 275 of the respective track 272. The carriage 290 is now advanced to its forward position (see FIG. 5E) so that the connector blocks B′ are slid, by cooperation between the plunger 310 and the upper walls 273 of the tracks 272 out of the tracks 273 each to pick-up position in which the connector B′ engages a second limit switch 362 at which position it is releasably held under the action of a light spring 363 (FIG. 5D). The plungers 310 are now retracted, the carriage 390 is retracted to its FIG. 5C position, and the grippers 332 are raised by the unit 322, with the jaws 334 of the grippers in their open connector block receiving positions so that each block B′ is received between these jaws as shown in FIG. 5C, after which the jaws 334 are moved by the units 336 to their closed positions and the carriage 290 is advanced again after the plungers 310 have been raised again, to transfer the next following block B″, to the pick-up position (the grippers 332 having been previously lowered by the unit 322 as will be apparent from FIG. 5E, so that each block B′ is located directly below the respective connector block holder 344. The motor 354 is actuated to swing the connector block clamping arms 348 to their FIG. 5F block receiving positions in which the holders 344 are open to receive the blocks B′. The gripper assembly 326 is again raised by the unit 322 so that each block B′ is inserted into its respective holder 344 to be lightly retained therein by means of its spring 346. The arrival of each block B′ at its position BP is signalled to the microprocessor by means of a further limit switch 347 which the block B′ then engages. The jaws 334 of the grippers 332 are then opened and the assembly 326 is again lowered by means of the unit 322 leaving each block B′ releasably secured in its holder 344. The motors 282 are operated to transfer a further block B into its respective channel 272 following the transfer of the block B″ to the pick-up position. After the blocks B′ in their block loading positions have been loaded with terminals T, they are ejected from their holders 344 as will be described below, so that the blocks B″ can be located in the holders 344.

THE BLOCK LOADING STATIONS

The construction of the block-loading stations 8, which according to the present example are identical, will now be described with particular reference to FIGS. 2B and FIGS. 6A to 6C. As shown in FIG. 2B, the station 8 of each unit 1 and 1′ comprises a gantry 364 consisting of an elongate carriage drive housing 366 mounted beside the station 4 on the opposite side thereof to the station 2, on legs 368 fixed to the base plate 38 and straddling the station 6. A jaw assembly carriage 370, carrying said jaw means 22, is arranged to be driven along a slide rod 371, lengthwise of the housing 366, along a horizontal axis X—X, by means of a bidirectional belt system 400 comprising a drive belt 404, which is shown schematically in FIG. 6C. The carriage 370 has a main slide 402 which projects beneath the housing 366 and is connected to the drive belt 404 so as to be driven thereby along the axis X—X. The drive belt 404 is driven by a bidirectional stepping motor drive unit 406, in intermittent reciprocating motion under the control of the microprocessor and in accordance with the program. There is slidably attached to the main slide 402 a further horizontal slide 408 which is arranged to be driven, relative to the slide 402, along a horizontal axis Y—Y, at right angles to the axis X—X, by means of a stepping motor drive unit 410 in the slide 408, which drives a pinion 412 acting upon a rack 414 in the main slide 402, as shown in FIG. 6C. The unit 410 is also controlled by the microprocessor according to the harness making program. A vertical slide 365 is slidably connected to the slide 408 from reciprocating motion along a vertical axis Z—Z by means of a stepping motor drive unit 414 in the slide 408 which drives a pinion 416 meshing with a vertical rack 418 on the slide 365. A jaw assembly 369 is fixed to the slide 365 and depends therefrom, the assembly 369 carrying the said jaw means 22. A further horizontal slide 374, mounted in a body part 367 of the assembly 369 is slidable horizontally therein in a direction parallel to the axis X—X on bearings 420 as shown in FIG. 6A. The slide 374 is driven by a stepping motor drive unit 422, under the control of the microprocessor and in accordance with the program, through a pinion 424 meshing with a horizontal rack 426 on the slide 374. The slide 374 is movable by means of the unit 422, between a central position in which the slide 374 is shown in FIG. 6B and right hand and left hand positions shown in broken lines in FIG. 6B. The slide 374 has thereon three pairs of the terminal gripping jaws 242, each pair being configured, as will be apparent from FIG. 6B, to grasp a different kind of terminal T. Each pair of jaws 242 is pivotally mounted in a jaw actuator assembly 372 containing a pneumatic piston and cylinder drive unit 373 (shown schematically) which may be similar to the piston and cylinder unit 28 of the jaw wheels 12 and 16 and which may be similarly coupled to the jaws 242. The units 373 are actuable in accordance with the program of the microprocessor. Each assembly 372 is mounted on an individual slide 380 which is vertically slidable along a pair of slide rods 382 between a horizontal flange 383 of the slide 374 and a lower end stop 384 on the pair of slide rods 382. The piston rod 388 of a piston and cylinder unit 386 has thereon a circular end flange 390 which is engageable in a horizontal groove 392 in one of the slides 380, in accordance with the horizontal position of the slide 374 for the selection of the appropriate pair of jaws 242 for each terminal to be loaded into a connector block B.

A sensor 428 (FIG. 6B) depending from a bracket 430 of the assembly 369, which bracket supports the unit 386, is arranged to signal to the microprocessor, the horizontal position of the slide 374 and thus indicate the particular slide 380, in the slot 392 of which the end flange 390 is engaged. FIG. 6B shows, in full lines, each slide 380 in its fully raised position, and in broken lines the center one of the slides 380 in its lowered position. FIG. 6A shows the slide 380 in its lowered position in full lines and in its raised position in broken lines. The lead gripping jaws 240 of the jaw means 22 are carried by a jaw holder 432 fixed to and depending from the body part 367 of the assembly 369, the jaws 240 being movable towards and away from one another horizontally, on slide rods 434 spanning a recess 436 in the holder 432, under the action of a pneumatic piston and cylinder drive unit 438 which is shown schematically in FIG. 6B, through a cam slot and follower mechanism 440 similar to that described above with reference to FIG. 3F, and which is also shown only schematically. The unit 438 is actuable under control of the microprocessor, to move jaws 240 between the open lead receiving position in which they are shown in FIG. 6B to a closed lead gripping position. As will be apparent from FIG. 6A, the lead gripping surfaces 442 of the jaws 240 are in alignment with the terminal gripping surfaces 444 of the jaws 242 when a selected slide 380 is in its lowered, terminal-receiving position. A slide drive assist pneumatic piston and cylinder unit 446 is also provided on the flange 430.

The operation of the block loading stations will now be described. In order to cause the jaws 240 and 242 of each harness making unit 1 and 1' to grip the lead and the terminal respectively, as shown in FIG. 4J, each carriage 370 is moved by its belt system 400, from a block loading position opposite to the feed station 6, to a position in which the jaws 240 are aligned with, and are above the lead L at the station 4. The slide 374 is driven by the unit 422 to position the pair of jaws 242 appropriate to the shape of terminal T of the lead L, above the lead L and the jaws 240, the jaws 242 being in an open position under the action of their drive unit 373 and the jaws 240 also being in open position under the action of their drive unit 438. The unit 410 having been operated to adjust the position of the slide 408 along the axis Y—Y to bring the jaws 240 into alignment with the lead L and the jaws 242 into alignment with the terminal, the unit 414 is actuated to lower the slide 365 along the Z—Z axis to an extent to bring the gripping surfaces 442 and 444 of the jaws 240 and 242, respectively, into alignment with the terminal and the lead respectively. The units 373 and 438 are then actuated to close the jaws 240 and 242 about the terminal T and the lead L respectively. The lead L having been gripped, the carriage 370 is returned by the unit 406 and belt system 400, along the X—X axis to position the jaw means 22 by which the lead is gripped, opposite to a predetermined cavity TC of a block B in its loading position at the station 6, the unit 414 having been operated to raise or lower the slide 365 along the Z—Z axis to take account of the vertical position of the cavity TC. The slide 408 is then advanced by the unit 410, along the Y—Y axis towards the station 6 so that the jaws 242 insert the terminal T partially into the cavity TC. The drive unit 373 of the jaws 242 gripping the terminal is then actuated to open these jaws and the unit 386 is operated to raise the lowered slide 380 along the Z—Z axis to its fully raised position, and the slide 408 is further advanced towards the station 6 along the Y—Y axis by the unit 410 so that the jaws 240, which still grip the lead L serve to insert the terminal T fully into its cavity. The unit 410 is again actuated slightly to withdraw the slide 408 along the Y—Y axis, away from the station 6, to carry out a pull test to determine whether the terminal has properly latched into its cavity. The extent of this retractile movement is determined by the microprocessor according to the program. If the programmed pull-out force is reached, the unit 438 is actuated to open the jaws 240, the unit 414 is actuated to raise the assembly 369 and the carriage 370 is returned to the terminal rotating station 4 to pick up a further lead L. If, however, the programmed pull-out force is not reached, the terminal T is pulled from its cavity as the slide 408 retracts, and the jaws 240 are opened to allow the lead L to fall therefrom. If the pull test is failed at the station 8 of one of the harness making units, the jaws 240 of the other harness making unit are also opened by the microprocessor to free the lead L. The jaws 240 are also opened in the manner described above if it is sensed that the terminal T has butted against the block B instead of having entered the cavity TC.

The two stations 8 thus cooperate to carry each lead L from the terminal rotating station 4 and to insert each end of the lead in a predetermined cavity TC of a block B.

According to the harness making program, the bottom row of each block B which has more than one row of terminal receiving cavities TC of cavities, is first loaded with terminals T, progressively, from left to right as seen in FIG. 2B, after which the cavities of the next adjacent row, there above, are loaded, and so on until each cavity that is to be loaded has been loaded with a terminal T.

This manner of carrying out the block-loading operations ensures that the leads of previously loaded terminals do not interfere with the ensueing loading operations.

THE HARNESS EJECTION AND BUNDLING STATION

The harness ejection and bundling station 10 of the harness making apparatus will now be described with particular reference to FIGS. 1, 2A and 7A to 7C. The lead grippers 24 of the station 10 are mounted so as to be independently slidable along the track 26, each by a drive electric motor drive unit 500, one of which is shown schematically in FIG. 7C and each of which is actuable to transport its gripper 24 along a longitudinal rail 502 in the track 26, under the control of the microprocessor, according to the harness-making program. The track 26 extends at right angles to the horizontal axis X—X along which the leads L are conveyed by the carriage 370. Each gripper 24 comprises an upper harness gripping jaw 504 and a lower harness gripping jaw 505, which jaws are movable linearly towards and away from one another along slide rods 506 by means of a piston and cylinder drive unit 509 under the control of the microprocessor and in accordance with the harness-making program. The jaws 504 and 505 of each gripper 24 are swingable through 90 degrees from a horizontal position to a vertical position about the axis of a spindle 507 of a bidirectional electric drive motor unit 508 also under the control of the microprocessor and in accordance with the program. The track 26 is secured to a vertical support beam 510 which is pneumatically extensible and contractible, longitudinally under the control of the microprocessor according to a harness ejection program. The beam 510 is in turn supported by a horizontal track 512 along which it is drivable by means of an electric motor drive unit 514 which is shown schematically in FIG. 7C. The track 512, which extends at right angles to the track 26, is secured by brackets 514' to a freestanding frame 516. Three bundling and taping assemblies 524 are slidably mounted on a rail 518 supported by opposite legs 520 of the frame 516, and are arranged to be secured at desired positions along the rail 518 by means of clamps 522. The bundling and taping assemblies 524 each comprises two lead bundling devices 525 and a harness taping device 532 disposed there between. Each bundling device 525 comprises a pair of lead bundling jaws 526, each taping device 532 comprising a pair of taping jaws 528. Each pair of jaws 526 is actuable by means of a pneumatic piston and cylinder drive unit 530 (FIG. 7A), to be driven, under the control of the microprocessor, between a raised, open position in which the jaws 526 are shown in FIG. 7C, and a lowered, closed, lead-bundling position. The taping jaws 528 are operated by a taping mechanism 533, supplied with bundling tape from a spool 534.

Once the blocks B at the stations 6 of the harness making units 1 and 1' have all been loaded with terminals T, so that a completed mixed harness has been provided, the track 502 being in the raised position in which it is shown in full lines in FIGS. 2A and 7A to 7C and the jaws 504 and 505 of the grippers 24 being in their horizontal, open positions, the unit 514 is actuated to drive the beam 510, and thus the grippers 24, towards the leads L of the harness H so that the jaws 504 and 505 of the grippers 24 receive the harness leads between them at positions adjacent to the respective stations 6. The units 509 of the grippers 24 are now actuated to close the jaws 504 and 505 thereof so as to grasp the leads. The beam 510 is then extended to lower the track 502 and thus the grippers 24, whereby the blocks B are pulled from the stations 6 against the action of the springs 346. The units 508 are now actuated to swing the jaws 504 and 505 down through 90 degrees to their vertical positions (shown in broken lines in FIG. 7C), the unit 500 is actuated to drive the left hand (as seen in FIG. 2A) gripper along the slideway 502 to an extent to stretch out the leads of the harness H. The unit 514 is then actuated to move the beam 510 back along the track 512 to align the leads of the harness H with the jaws 526 and 528 of the assemblies 524, which are in their open positions. The beam 510 is now extended to lay the leads L of the harness H between the pairs of open jaws 526, and the units 530 are actuated to close the jaws 526 about the harness leads and to lower the jaws 526, and the beam 510 is further extended to accommodate the retraction of the jaws 526. The leads having been bundled by the jaws 526, the bundled leads, which now lie between the taping jaws 528, are taped by operation of the taping devices 532. When the bundling and taping operations have been completed, and the jaws 526 and 528 have been opened, the beam 510 is contracted so as to raise the taped and bundled harness H, and the unit 514 is actuated to move the beam 510 rightwardly (as seen in FIG. 7) so as to position the harness H over a harness bin 550 adjacent to the assemblies 524, after which the units 509 are actuated to open the jaws 504 and 505 so that the harness H drops into the bin. The movements of the grippers 24 and the beam 510 are indicated in broken lines in FIG. 7C. The parts of the station 10 are finally returned to their starting positions to pick up and stow a further harness H produced by the harness making units 1 and 1'.

According to the modification of FIG. 7D, which allows for the bundling and taping of harnesses H' having leads L' of different lengths, the rail, which is referenced 518' in FIG. 7D is vertical instead of being horizontal and is provided with lead gathering forks 522 for guiding the leads L' into the bundling devices of the assemblies 524. One of the grippers 24 is operated to release the harness H' and the other gripper 24 is then moved towards the assemblies 524.

We claim:

1. An electrical lead parking and sorting station for receiving electrical leads and presenting the leads for pick up, in a predetermined order according to a program, comprising a support structure;

- a lead carrier support mounted to the support structure for swinging movement relative thereto;
- a pair of lead carriers each connected to the lead carrier support for rotation relative thereto, and each having a series of pairs of lead gripping jaws constantly spaced from each other about its axis of rotation and jaw drive units for individually and sequentially opening and closing the pairs of jaws as determined by said program;
- a lead carrier support drive unit actuable to swing the lead carrier support relative to said support structure thereby to swing each lead carrier in turn between a lead loading first position and a lead sorting and discharge second position; and
- lead carrier drive means actuable intermittently to rotate each lead carrier through equal angular first steps about its axis when the lead carrier is in its first position and bidirectionally through unequal, angular second steps about its axis as determined by the program, when the lead carrier is in its second position.

2. A lead parking and sorting station according to claim 1, further comprising a drive mechanism drive rotating each lead carrier through half a revolution about its axis of rotation, in the opposite sense to the sense of rotation of said lead carrier support, as the lead carrier is being swung from its first position to its second position.

3. A lead parking and sorting station according to claim 1, wherein the lead carrier drive means comprises a unidirectional first stepping motor for rotating each lead carrier through said first steps, when the lead carrier is in its first position and a bidirectional second stepping motor for rotating each lead carrier bidirectionally, and through said second steps when the lead carrier is in its second position.

4. A lead parking and sorting station according to claim 3, wherein the stepping motors are fixed with respect to the support structure, and mechanism is provided for connecting each lead carrier to the first stepping motor when the lead carrier is in its first position, for connecting each lead carrier to the second stepping motor when the lead carrier is in its second position and for disconnecting each lead carrier from the stepping motor, to which it is connected, to allow the lead carriers to be swung between their first and second positions.

5. A lead parking and sorting station according to claim 1, wherein the lead carrier support is swingable by its drive unit about a horizontal axis, the axes of rotation of the lead carriers extending on either side of the swinging axis of the lead carrier support and in parallel relationship thereto.

6. A lead parking and sorting station according to claim 1, wherein each lead carrier is mounted for rotation about the axis of a shaft in said lead carrier support, said shaft having a head which is extensible relative thereto so as to engage and be entrained by a shaft of said lead carrier drive means under the action of a control device in each of the first and second positions of the lead carrier, said control device being arranged to cause the head to be retracted relative to the shaft prior to the actuation of said lead carrier support drive unit.

7. A lead parking and sorting station according to claim 6, wherein the lead carrier support is swingable about the axis of a shaft in said support structure, which shaft is connected to said heads to rotate each of them through a single revolution during each swinging movement of the lead carrier support.

8. A lead parking and sorting station according to claim 7, wherein said support structure comprises a base plate with a bearing support block mounted thereon, and supporting each of said shafts, the drive means of the lead carriers being mounted on the same side of the base plate as the bearing support block and the drive unit of the lead carrier support being mounted on the opposite side of the base plate and having a drive spindle extending at right angles to the shaft of the lead carrier support drive unit and being drivably connected thereto through gearing.

9. A lead parking and sorting station according to claim 7, wherein each control device comprises a plunger which is advancable to lock the lead carrier support to the support structure when the lead carriers are in their first and second positions and to extend each head against the action of a return spring.

10. A lead parking and sorting station according to claim 9, wherein the plunger is located to engage a rack in the lead carrier support to drive a pinion meshing with a slide in the lead carrier support, the slide seating the return spring and being drivably engaged with the head.

* * * * *